United States Patent [19]
Reik et al.

[11] Patent Number: 5,622,245
[45] Date of Patent: Apr. 22, 1997

[54] TORQUE TRANSMITTING APPARATUS

[75] Inventors: Wolfgang Reik, Bühl; Johann Jäckel, Baden/Baden, both of Germany

[73] Assignee: LuK Lamellen und Kupplungsbau GmbH, Buhl, Germany

[21] Appl. No.: 262,620

[22] Filed: Jun. 20, 1994

[30] Foreign Application Priority Data

Jun. 19, 1993 [DE] Germany .......................... 43 20 381.7
Sep. 30, 1993 [DE] Germany .......................... 43 33 460.1

[51] Int. Cl.$^6$ .............................. F16D 13/71; F16D 13/60
[52] U.S. Cl. .................. 192/55.1; 192/55.61; 192/70.18; 192/212; 464/67
[58] Field of Search .............................. 192/70.17, 70.18, 192/55.1, 55.61, 203, 212, 55.2, 214; 74/574; 464/41, 66, 67

[56] References Cited

U.S. PATENT DOCUMENTS

| | | | |
|---|---|---|---|
| 2,826,902 | 3/1958 | DeCoursey | 192/212 X |
| 3,802,222 | 4/1974 | Weber | 464/41 X |
| 4,567,974 | 2/1986 | Birk | 192/70.18 |
| 4,607,738 | 8/1986 | Muller | 192/70.18 X |
| 4,697,679 | 10/1987 | Naudin | 192/70.18 |
| 4,739,866 | 4/1988 | Reik et al. | 192/70.17 |
| 4,760,754 | 8/1988 | Friedmann | 192/55.61 X |
| 4,816,006 | 3/1989 | Friedmann | 464/67 |
| 4,856,636 | 8/1989 | Meinhard | 192/70.17 |
| 4,989,710 | 2/1991 | Reik et al. | 192/70.17 |
| 5,042,632 | 8/1991 | Jäckel . | |
| 5,151,065 | 9/1992 | Maucher et al. | 74/574 X |
| 5,161,660 | 11/1992 | Huber . | |
| 5,176,233 | 1/1993 | Woerner et al. | 74/574 X |

FOREIGN PATENT DOCUMENTS

| | | | |
|---|---|---|---|
| 3427163 | 4/1986 | Germany | 464/66 |
| 4215593 | 11/1992 | Germany | 464/44 |
| 549308 | 10/1956 | Italy | 192/70.18 |
| 531214 | 12/1940 | United Kingdom | 192/70.18 |

*Primary Examiner*—Rodney H. Bonck
*Attorney, Agent, or Firm*—Darby & Darby

[57] ABSTRACT

A torque transmitting apparatus which can be used in the power train between the prime mover and the transmission of a motor vehicle has a first flywheel connectable to the prime mover, a second flywheel coaxial with and receiving torque from the first flywheel by way of a damper, and a friction clutch which can be engaged to transmit torque between the second flywheel and the input element of the transmission. The energy storing elements of the damper and the bearing between the two flywheels are installed radially inwardly of the friction surfaces of the second flywheel and the axially movable pressure plate of the friction clutch. This renders it possible to reduce at least the radial dimensions of the apparatus without reducing the diameters of the friction surfaces.

156 Claims, 11 Drawing Sheets

TORQUE TRANSMITTING APPARATUS

BACKGROUND OF THE INVENTION

The present invention relates to torque transmitting apparatus in general, and more particularly to improvements in torque transmitting apparatus wherein a first flywheel can receive torque from a rotary output member of a prime mover (e.g., from the crankshaft or camshaft of an internal combustion engine in a motor vehicle), wherein a second flywheel is rotatable with and relative to the first flywheel about a common axis, and wherein rotation of the flywheels relative to each other is opposed by one or more dampers. The second flywheel can transmit torque to a rotary input element (e.g., to the input shaft of a variable-speed transmission in the power train between the engine and the wheels of a motor vehicle), and the transmission of torque from the second flywheel to the input element can take place by way of an engageable and disengageable friction clutch.

The invention also relates to improvements in friction clutches which can be utilized in the above-outlined torque transmitting apparatus or in other types of torque transmitting apparatus to transmit torque or to interrupt the transmission of torque between a prime mover and one or more driven units, e.g., between an engine and the wheels of a motor vehicle.

Still further, the invention relates to improvements in means (e.g., one or more dampers and/or one or more friction generating devices, such as slip clutches) which can be utilized in the above-outlined or other types of torque transmitting apparatus to predictably oppose the rotation of several masses (e.g., two or more flywheels) relative to each other.

OBJECTS OF THE INVENTION

An object of the invention is to provide a torque transmitting apparatus which is simpler and less expensive than, but at least as reliable as, heretofore known torque transmitting apparatus.

Another object of the invention is to provide a torque transmitting apparatus which is constructed and assembled in such a way that its space requirements in the direction of the axis of rotation of its parts, as well as in directions radially of such axis, are less than in conventional torque transmitting apparatus.

A further object of the invention is to provide a torque transmitting apparatus which can embody a friction clutch with large-diameter friction surfaces in spite of the compactness of its constituents in directions radially of the axis of rotation of the rotary parts.

An additional object of the invention is to provide a torque transmitting apparatus which employs one or more friction clutches with friction surfaces having radii at least matching the radii of friction surfaces in heretofore known bulkier and more expensive friction clutches.

Still another object of the invention is to provide a torque transmitting apparatus whose useful life is longer than that of heretofore known torque transmitting apparatus.

A further object of the invention is to provide a power train which can be utilized in motor vehicles as a superior substitute for heretofore known and used power trains.

Another object of the invention is to provide a novel and improved method of assembling and installing the above-outlined improved power train and/or its constituents.

An additional object of the invention is to provide a conveyance, such as a motor vehicle, which embodies a power train utilizing the above-outlined torque transmitting apparatus.

Still another object of the invention to provide a novel and improved module which embodies the above-outlined power train and can be conveniently affixed to or detached from a rotary output element of a prime mover, e.g., a crankshaft or a camshaft driven by the combustion engine or another motor in an automobile or another vehicle.

A further object of the invention is to provide a novel and improved method of making the component parts of the above-outlined torque transmitting apparatus.

Another object of the invention is to provide a novel and improved friction clutch which can be utilized in the above-outlined torque transmitting apparatus and/or in other apparatus to transmit torque or to interrupt the transmission of torque between a prime mover and one or more driven assemblies.

An additional object of the invention is to provide a torque transmitting apparatus whose reliability at least matches that of conventional apparatus, even though it can comprise or actually comprises a much smaller number of parts or groups of parts.

Still another object of the invention is to provide a torque transmitting apparatus whose component parts can be mass-produced in available machines and with minimal losses in material.

A further object of the invention is to provide a torque transmitting apparatus which can be practically fully assembled at the manufacturing plant and can be assembled of parts which require a minimum of treatment, or no treatment at all, in material removing machines so that the making of the apparatus can be carried out without adversely affecting the surrounding atmosphere.

Another object of the invention is to provide an apparatus which is designed in such a way that the making of its parts and/or the assembly of such parts into an operative torque transmitting apparatus can be automated to any desired extent.

An additional object of the invention is to provide a torque transmitting apparatus which is constructed and assembled to reliably prevent excessive stressing of its constituents, for example, to prevent the transmission of excessive torque from one or more driving parts to the corresponding or associated driven part or parts.

Still another object of the invention is to provide an apparatus which is constructed and assembled in such a way that its constituent or constituents (e.g., a flywheel or a friction clutch) cannot transmit excessive torque to a variable speed transmission and/or other part or parts in the power train of a motor vehicle.

A further object of the invention is to provide a novel and improved connection between the housing and the pressure plate of a friction clutch which can be utilized in the above-outlined torque transmitting apparatus or elsewhere.

Another object of the invention is to provide a novel and improved system for effectively cooling a torque transmitting apparatus of the above-outlined character.

An additional object of the invention is to provide novel and improved energy storing means for use in dampers between the flywheels which are used in the above-outlined or other torque transmitting apparatus.

Still another object of the invention is to provide a novel and improved distribution of component parts in the above-outlined torque transmitting apparatus and to afford convenient access to certain component parts of such apparatus, either to facilitate rapid assembly and mounting on a rotary output element or to facilitate rapid detachment of the apparatus from the output element.

A further object of the invention is to provide a novel and improved combination of pressure plate, clutch spring and housing in a friction clutch which can be put to use in the above-outlined apparatus.

Another object of the invention is to provide the above-outlined torque transmitting apparatus with a friction clutch which automatically adjusts the positions of its parts to compensate for wear so that the friction clutch can remain encapsulated during the entire useful life of the machine, e.g., a motor vehicle, wherein the torque transmitting apparatus is put to use.

SUMMARY OF THE INVENTION

One feature of the present invention resides in the provision of an apparatus which is designed to transmit torque and comprises a first flywheel connectable with a rotary output element (e.g., a camshaft or a crankshaft) of a prime mover (e.g., a combustion engine under the hood of a motor vehicle), and a second flywheel which is rotatable with, as well as relative to, the first flywheel about a common axis and is connectable with a rotary input element of a driven unit (e.g., with the input shaft of a variable-speed transmission in the power train between the engine and the wheels of a motor vehicle). The transmission of torque from the second flywheel to the input element preferably takes place by way of a friction clutch having one or more annular friction surfaces disposed at a first radial distance from the common axis of the flywheels. The improved apparatus further comprises a bearing which is interposed between the first and second flywheels and means for opposing rotation of the first and second flywheels relative to each other. Such opposing means comprises at least one damper having at least two energy storing elements disposed at least in part in an at least substantially sealed chamber and extending in a circumferential direction of the flywheels at a second radial distance from the common axis which is less than the first radial distance.

The arrangement can be such that the energy storing elements have first portions disposed at a greater radial distance and second portions disposed at a lesser radial distance from the common axis of the flywheels, and that at least the first portions of the energy storing elements are confined in the chamber. The chamber is preferably bounded by a surface including a portion conforming to and adjacent the first portions of the energy storing elements.

The chamber is preferably defined by an enclosure having at least two walls at least one of which is connected (e.g., welded or otherwise bonded and/or riveted) to the second flywheel. The arrangement can be such that the at least one wall supports the second flywheel.

The aforementioned bearing can include or constitute a friction (sliding) bearing and/or an antifriction (e.g., roller, ball or needle) bearing.

At least one of the energy storing elements can include or constitute at least one coil spring or at least one torsion spring.

The aforementioned enclosure which defines the chamber for the energy storing elements of the at least one damper can be designed in such a way that it comprises a radially outer portion disposed at a greater distance and a radially inner portion disposed at a lesser distance from the common axis of the flywheels. At least the inner portion of the enclosure is or can be at least substantially sealed so that a supply of dry lubricant (e.g., graphite powder) or a supply of viscous lubricant (e.g., grease, paste or highly viscous oil) which at least partially fills the chamber is prevented from leaving the chamber. The means for sealing the chamber from the atmosphere can include at least one labyrinth seal, at least one membrane, at least one diaphragm spring and/or a bonded seam.

The enclosure can be designed in such a way that at least a portion of the bearing is also confined in its chamber. Such bearing is or can be installed between the two flywheels at a third radial distance from the common axis of the flywheels, namely in such a way that it is located radially inwardly of the energy storing elements forming part of the at least one damper.

The enclosure can comprise first and second walls which are connected (e.g., welded or otherwise bonded) to each other radially outwardly of the energy storing elements. Such enclosure can further comprise at least one sealing element (e.g., an O-ring) which is installed between the two walls radially inwardly of the energy storing elements. Furthermore, one or more analogous seals can be installed between the two walls of the enclosure radially outwardly of the energy storing elements.

The wall or walls of the enclosure can be provided with one or more abutments for the energy storing elements in the chamber so that, if the enclosure is affixed to the second flywheel, the energy storing elements (which can receive torque from an input member of the at least one damper rotating with the first flywheel) can transmit torque to the second flywheel (which, in turn, transmits torque to the input element by way of the friction clutch) in response to rotation of the first flywheel (i.e., in response to rotation of the output element of the prime mover). The abutments can constitute or include pairs of confronting depressions which are provided in the wall or walls of the enclosure and extend substantially in the direction of the common axis of the flywheels, into the chamber, and between the energy storing elements in the chamber.

The at least one wall of the enclosure for the energy storing elements can be connected (either directly or indirectly) with the second flywheel. Such wall or walls can be disposed at that side of the second flywheel which faces away from the at least one friction surface of the clutch. The second flywheel preferably constitutes or carries a counter-pressure plate of the friction clutch, the at least one friction surface of such clutch can be provided on the second flywheel, and another friction surface of the friction clutch is then provided on an axially movable rotary pressure plate of the friction clutch.

The connection between the wall or walls of the enclosure and the second flywheel can be a form-locking connection. Alternatively, one or more walls of the enclosure can be in mere frictional engagement with the second flywheel.

The input member of the at least one damper can constitute a portion of the first flywheel, and such a portion transmits torque to the energy storing elements in response to rotation of the first flywheel, i.e., in response to rotation of the output element of the prime mover. Such apparatus can further comprise means for limiting the magnitude of torque which is being transmitted by the second flywheel to the friction clutch. The torque limiting means can be installed between a wall of the enclosure which receives torque from the energy storing elements and the second flywheel. One presently preferred embodiment of the limiting means comprises at least one friction generating member (e.g., a brake shoe or the like) which is installed between the enclosure and the second flywheel, preferably at least partially outwardly of the energy storing elements and at least partially radially inwardly of the at least one friction surface of the friction clutch. The limiting means can further comprise means for biasing the second flywheel and/or the enclosure against the at least one friction generating member, and such biasing means can comprise one or more diaphragm springs. The biasing means can be designed in such a way that it is actuatable to urge the second flywheel and/or a wall of the enclosure against the at least one friction generating member. The means for actuating the biasing means can be operated by the first flywheel, and at least a portion of such actuating means can form part of the primary flywheel, e.g., it can be of one piece with the first flywheel.

If the enclosure defining the chamber for the energy storing elements of the at least one damper is designed to receive torque from the energy storing elements, the apparatus can further comprise friction generating torque transmitting means interposed between the enclosure and the second flywheel to transmit torque from the energy storing elements to the friction clutch by way of the second flywheel. The friction generating means can contain a suitable heat insulating material.

The only wall or at least one wall of the enclosure can be mounted on the bearing between the two flywheels.

The at least one damper can further comprise an input member (e.g., one or more substantially flange-like parts) which extends into the chamber to transmit to the energy storing elements torque in response to rotation of the first flywheel, and such input member can be connected to the first flywheel radially inwardly of the energy storing elements. The means for fastening the torque transmitting apparatus to the output element of a prime mover can include a set of fasteners (e.g., threaded fasteners in the form of screws or bolts and hereinafter called bolts for short) and such fasteners can serve to affix the first flywheel to the output element as well as to affix the input member of the at least one damper to the first flywheel.

The input member of the at least one damper can comprise a plurality of flanges or like parts having radially outer portions connected to each other, and at least one of the flanges can comprise at least one projection (e.g., in the form of an arm) which extends into the chamber to transmit torque to the energy storing elements in response to rotation of the first flywheel. At least one of the flanges is connected with the first flywheel, preferably radially inwardly of the energy storing elements. The flanges can include portions which are disposed in the region of the fastening means and are closely adjacent each other. Each of the flanges can comprise a portion which extends into the chamber to transmit torque to the energy storing elements in response to rotation of the first flywheel, and such flanges can further comprise portions which are spaced apart from each other in the direction of the common axis of the flywheels and are disposed at least in part intermediate the fastening means and the energy storing elements.

The energy storing elements can comprise coil springs each having two end convolutions and one or more intermediate convolutions between the end convolutions. The aforementioned portions of the flange or flanges forming part of or constituting the input member of the at least one damper and serving to transmit torque to the coil springs are preferably configured in such a way that they transmit torque to the neighboring end convolutions in response to rotation of the first flywheel without appreciably changing the orientation of the engaged end convolutions relative to the respective additional convolutions.

The at least one damper can be constructed in such a way that its energy storing elements comprise first coil springs and second coil springs at least partially within the respective first coil springs. The input member of such damper receives torque from the first flywheel, either directly or indirectly, and includes first and second portions which extend into the chamber to respectively transmit torque to the first and second coil springs in response to rotation of the first flywheel. At least one wall of a multiple-wall enclosure or the only wall of a single-wall enclosure which is connected to the second flywheel can comprise first and second abutments which extend into the chamber to respectively receive torque from the first and second springs of the energy storing elements in response to rotation of the first flywheel. The first abutments can include deformed portions of the wall which extends into the chamber, and the second abutments can constitute or include deformed parts of the deformed portions.

The input member (e.g., an input member including one or more flanges) of the at least one damper can include or can be mounted on suitable means for centering the input member on the first flywheel. Alternatively, the improved apparatus can comprise means for centering the input member of the at least one damper directly on the output element of the prime mover which drives the first flywheel. Still further the input member of the at least one damper can be designed to support the bearing which is installed between the two flywheels.

The at least one damper can comprise a plurality of input members which transmit torque to the energy storing elements of the damper in response to rotation of the first flywheel. At least one of these input members can include means for connecting the first flywheel to the input element of the prime mover, means for centering the first flywheel on the output element of the prime mover, means for supporting the bearing, and means for centering the second flywheel.

The means for sealing the chamber for the energy storing elements of the at least one damper can comprise at least one sealing element (e.g., a diaphragm spring) which is disposed radially inwardly of the energy storing elements between the wall, or one wall, of the enclosure and the single input member or one of several input members of the at least one damper. If the enclosure comprises two or more walls, one of the walls can be engaged by the aforementioned sealing element and the other wall (or another wall) of such enclosure can be connected with the one wall and with one of the flywheels. One of the plural walls of the enclosure can include means for maintaining the fastening means in a predetermined position relative to the first flywheel.

The only wall or at least one of two or more walls of the enclosure can be provided with openings, one for each bolt of the fastening means, and each bolt extends through the respective opening.

The enclosure which defines the chamber for the energy storing elements of the at least one damper can be designed in such a way that its single wall or at least one of its plural walls is provided with openings which are positioned to permit the passage of a tool (e.g., a motor-operated screw driver) having means for rotating the bolts of the means for fastening the first flywheel to the output element of the prime mover. The wall or walls which are provided with such openings can include collars which surround the openings.

The enclosure can further comprise at least one sealing element for the chamber, and such at least one sealing element can be disposed in the region of the aforementioned openings.

The means for sealing the chamber can include at least one diaphragm spring forming part of a friction generating device which is installed to operate between the flywheels.

The energy storing elements of the at least one damper can be disposed in a common plane extending at right angles to the common axis of the flywheels, and the at least one friction surface can be provided on the second flywheel at least close to the common plane for the energy storing elements.

The heads of the bolts which form part of the means for fastening or securing the first flywheel to the output element of the prime mover can be disposed in a common plane which is normal to the common axis of the flywheels, and the bearing can be disposed in or at least close to such plane.

The distribution of various parts of the improved torque transmitting apparatus can be such that the heads of the bolts are disposed in or close to a plane extending at right angles to the common axis of the flywheels, that the at least one friction surface of the friction clutch is disposed at such plane, and that the energy storing elements of the at least one damper are disposed radially between the heads and the friction surface(s).

At least a portion of the input member of the at least one damper can be disposed between the bolts of the fastening means and the chamber for the energy storing elements.

The input element of the transmission can be provided with axially parallel flutes or with another suitable profile for engagement by the clutch disc or clutch plate of the friction clutch, and such profile is disposed at a first radial distance from the common axis of the two flywheels when the friction clutch is properly connected with and is ready to transmit torque to the input element. The bearing is disposed at a second radial distance from the common axis, and the bolts of the fastening means are disposed at a third radial distance from the common axis. The enclosure which defines the chamber for the energy storing elements of the at least one damper includes a radially inner portion which is disposed at a fourth radial distance from the common axis, and the energy storing elements are disposed at a fifth radial distance from the common axis. The enclosure further includes a radially outer portion which is disposed at a sixth radial distance from the common axis, and the at least one friction surface (on the second flywheel or on the pressure plate of the friction clutch) is disposed at a seventh radial distance from the common axis. In accordance with one presently preferred embodiment of the invention, at least four of the above-enumerated seven radial distances are different from each other. For example, the construction of the apparatus can be such that the second radial distance exceeds the first radial distance, that the third radial distance exceeds the second radial distance, that the fourth radial distance exceeds the third radial distance, and so forth.

Furthermore, the profile of the input element can have a first diameter, the bearing can have a different second diameter, the heads of the bolts can form a circle having a third diameter different from the first and second diameters, the radially inner portion of the enclosure can have a fourth diameter which is different from the first to third diameters, the energy storing elements can form an annulus having a fifth diameter different from the first to fourth diameters, the radially outer portion of the enclosure can have a sixth diameter different from the first to fifth diameters, and the at least one friction surface can have a seventh diameter different from the first to sixth diameters.

At least four of the above-enumerated parts, namely the profile of the input element of the transmission, the bearing, the bolts, the radially inner portion of the enclosure, the energy storing elements, the radially outer portion of the enclosure and the at least one friction surface, are or can be located at least close to a plane which is normal to the common axis of the flywheels when the clutch is properly connected with the input element.

It is also possible to construct and assemble the improved torque transmitting apparatus in such a way that the bolts are disposed at a first radial distance and the bearing is disposed at a lesser second radial distance from the common axis of the flywheels. Thus, the bearing can be installed closer to the common axis than the bolts or vice versa.

Still further, it is possible to design the apparatus in such a way that the bolts are disposed at a first radial distance from the common axis of the flywheels, that the bearing is disposed at a lesser second radial distance from such axis, and that the energy storing elements of the at least one damper are disposed at a third radial distance from the common axis, namely a distance exceeding the first distance.

The common plane of the heads of the bolts can be at least close to or can coincide with the common plane of the energy storing elements.

It is also possible to construct and assemble the improved torque transmitting apparatus in such a way that a portion of the enclosure is located at a first radial distance from the common axis of the flywheels, that the energy storing elements are disposed at a different second radial distance from the common axis, and that the bolts are located at a third radial distance from such axis. The first distance can exceed the third distance and can be less than the second distance.

As already mentioned above, the bearing can be disposed at a greater or lesser radial distance from the common axis of the flywheel than the bolts of the means for fastening or securing the first flywheel to the output element of a prime mover.

As also mentioned above, the energy storing elements of the at least one damper can include or constitute coil springs. Each coil spring can have a length between approximately four and ten times the diameters of its convolutions. Such energy storing elements can extend in the chamber along arcs, the sum of which would be between approximately 252° and 342° if the energy storing elements were installed in their chamber end-to-end. At least one of the energy storing elements can extend along an arc of at least 140°.

If the energy storing elements are arcuate springs (e.g., coil springs or torsion springs), they can be shaped in the manufacturing plant in such a way that their curvature does not change at all, or does not undergo any appreciable change, during installation in or upon removal from the chamber.

The energy storing elements can be selected and installed in such a way that at least one first energy storing element opposes rotation of the flywheels relative to each other with a first force and that at least one second energy storing element opposes rotation of the flywheels relative to each other with a second force which is different from (namely greater or smaller than) the first force. Furthermore, the energy storing elements can be designed and mounted in such a way that at least one such element opposes a first stage of rotation of the flywheels relative to each other and that at least one other element opposes a second stage of such rotation. The second stage can partially overlap the first stage or can follow or precede the first stage.

If the energy storing elements are or include coil springs, the configuration of their convolutions can be such that the pitch of each end convolution or at least one of the two end convolutions of each coil spring is the same or nearly the same as the pitch of each additional (intermediate) convolution of each coil spring.

A body of wear-resistant material can be installed in the chamber of the enclosure radially outwardly of the energy storing elements so that it is contacted by the energy storing elements when such elements tend to move radially outwardly under the action of centrifugal force in response to rotation of the enclosure with one of the flywheels. Such a body protects the radially outer portion of the enclosure from excessive wear and its material can be selected with a view toward reducing friction between the body and the energy storing elements in the chamber.

The apparatus can further comprise means for centering the housing of the friction clutch on the second flywheel.

The housing of the friction clutch can be provided with a portion (e.g., a tubular or cylindrical portion) which extends in the direction of the common axis of the flywheels and at least partially surrounds the second flywheel. Such axially-extending portion can center the housing on the second flywheel. Furthermore, such axially-extending portion of the housing can be welded or otherwise bonded or affixed to the second flywheel. It is also possible to separably couple the aforementioned portion of the housing to the second flywheel. The means for separably coupling can include one or more discrete parts or can form part of the housing.

The improved torque transmitting apparatus can be constructed and assembled in such a way that a radially extending portion of the clutch disc or clutch plate is adjacent to one side of the single wall or one of several walls of the enclosure, one side of such portion of the clutch disc is adjacent and at least substantially conforms to the outline of the side of the wall. This entails desirable savings in space.

One or more walls of the enclosure can be provided with openings which afford access to the bolts of the means for fastening the first flywheel to the output element of the prime mover. The clutch disc and/or the wall or walls of the enclosure can be provided with means for deflecting a viscous or pulverulent lubricant, which at least substantially fills the chamber, when the lubricant tends to escape from the chamber in the region of the clutch disc and/or the adjacent wall or walls of the enclosure.

The clutch disc can be provided with one or more openings affording access to the heads of the bolts and permitting such bolts to pass therethrough for the purpose of introducing their shanks into tapped holes or bores provided in the output element of the prime mover. In addition to the clutch disc, one or more additional constituents of the friction clutch (such as the housing and/or the pressure plate and/or the clutch spring) can be provided with openings which enable the working end of a suitable tool to reach the heads of the bolts, either for the purpose of driving the shanks of the bolts into the output element or for the purpose of disconnecting the first flywheel from the output element.

The friction clutch which is used in the improved apparatus can be constructed and assembled in such a way that the clutch spring (such as a diaphragm spring) which is installed between the housing and the axially movable pressure plate includes a substantially washer-like main portion and a set of prongs extending radially of the main portion, e.g., radially inwardly toward the common axis of the flywheels. The main portion of the clutch spring bears upon the pressure plate to thus ensure that the clutch disc is reliably clamped between and rotates with the pressure plate and the counterpressure plate (the latter preferably constitutes or forms part of the second flywheel) in the engaged condition of the friction clutch. The main portion of the clutch spring is movable in the direction of the common axis of the flywheels toward and away from the clutch disc, and the outline of that side of the main portion of the clutch spring which confronts the counterpressure plate is preferably selected in such a way that it is adjacent and at least substantially conforms to the outline of one side of the clutch disc upon movement of the main portion of the clutch disc toward the counterpressure plate. As already mentioned above, the clutch disc can be provided with openings, preferably adjacent the prongs of the clutch spring, which permit the bolts to pass therethrough, either toward engagement with the output element of the prime mover or during detachment of the first flywheel from the output element. Additional openings can be provided in the clutch spring in order to enable the working end of a tool, such as a motorized screw driver, to reach the heads of the bolts.

The housing and the counterpressure plate (preferably constituting or forming part of the second flywheel) rotate as a unit when the first flywheel is driven by the prime mover, and the pressure plate of the clutch is disposed between and is rotatable with the housing and the counterpressure plate. The pressure plate can be provided with one or more projections which confront the housing and are received, or are receivable, in openings provided therefor in the clutch spring. The openings for the projections of the pressure plate can be disposed between neighboring prongs of the clutch disc, i.e., the latter can be constructed in such a way that it includes relatively narrow slots between certain neighboring prongs and wider slots (constituting openings for the projections of the pressure plate) between certain other neighboring prongs. For example, certain prongs can be omitted or cut away in order to provide (with the neighboring narrow slots) openings for the projections of the pressure plate.

The pressure plate is or can be axially movably connected with the housing of the friction clutch by a set of leaf springs. In accordance with a further feature of the invention, at least a portion of each leaf spring is connected to that side of the housing which faces away from the pressure plate. This constitutes a radical departure from the mounting of leaf springs in heretofore known friction clutches wherein the leaf springs are connected to the pressure plate and to that side of the housing which confronts the pressure plate.

If the clutch spring is a diaphragm spring, that side of the housing which confronts the pressure plate preferably carries a ring-shaped seat assembly (e.g., two wire rings at opposite sides of the diaphragm spring) which tiltably supports the main portion of the diaphragm spring. That side of the pressure plate which faces toward the housing can be designed to have an outline which is at least substantially complementary to the outline of the seat assembly. The other side of the pressure plate is provided with the at least one friction surface or with one of two friction surfaces; the friction surface or surfaces serve to engage the adjacent radially outer portion of the clutch disc so that the latter is clamped between the pressure plate and the counterpressure plate in the engaged condition of the friction clutch. The outline of that side of the pressure plate which faces the housing and the seat assembly can be configured in such a way that the seat assembly is overlapped by the pressure plate in the direction of the common axis of the flywheels as well as radially of the common axis in the disengaged condition of the friction clutch. All this contributes to compactness of the friction clutch and of the entire torque transmitting apparatus.

At least one of the seats of the composite seat assembly or the single seat of a simplified seat assembly is secured to the housing, preferably in such a way that the means for securing the seat or seats forms part of the housing of the friction clutch. For example, the securing means can include prongs or lugs which are inwardly bent portions of the bottom end wall of the clutch housing. As mentioned above, that side of the axially movable pressure plate of the friction clutch which faces the housing can have an outline or contour which is selected with a view to permit the seat or seats for the main portion of the diaphragm spring (clutch spring) to be at least partially recessed into the pressure plate in the disengaged condition of the clutch.

Additional savings in space can be achieved if the single wall or one of several walls of the enclosure (namely the wall adjacent the first flywheel) is configured in such a way that the outline of that side which faces the first flywheel is complementary to the adjacent portion of the first flywheel.

At least the major portion of at least one of the flywheels, particularly the first flywheel, can consist of metallic sheet material.

A starter gear can be provided on one of the flywheels, particularly on the first flywheel. The starter gear can comprise several (e.g., two) overlapping layers of folded metallic sheet material. Such starter gear, or a differently made starter gear, can be of one piece with one of the flywheels, particularly with the first flywheel.

In order to enhance the inertia of the first flywheel, this flywheel can comprise a main section (e.g., of metallic sheet material) and a mass which is connected to or is of one piece with the main section. The mass can constitute a casting or it can comprise layers of folded metallic sheet material.

The mass of the first flywheel can be configured to at least partially surround the axially extending portion of the clutch housing.

The means for opposing rotation of the flywheels relative to each other or the at least one damper can comprise a friction generating device, e.g., a slip clutch. The friction generating device can be disposed radially outwardly of the energy storing elements of the at least one damper. The at least one friction surface of the friction clutch can be dimensioned and positioned in such a way that it includes a first portion at a first radial distance from the common axis of the flywheel, an intermediate portion at a greater second radial distance from the common axis, and a third portion at a greatest radial distance from the common axis. The friction generating device can be installed at a fourth radial distance from the common axis of the flywheels, preferably a fourth distance which matches or exceeds the second radial distance.

The friction generating device can be constructed in such a way that it comprises at least one carrier or shoe having two friction surfaces disposed at different radial distances from the common axis of the flywheels. The at least one shoe can be maintained in frictional engagement with the first flywheel. Furthermore, the second flywheel can include a portion in frictional engagement with the at least one shoe. The at least one shoe can be dimensioned and positioned in such a way that it has limited freedom of angular movement relative to the aforementioned portion of the second flywheel about the common axis of the flywheels and/or vice versa.

It is also possible to employ a friction generating device which comprises a plurality of shoes; the second flywheel then preferably comprises portions, each of which engages or can engage one of the shoes. At least some of the shoes and the respective portions of the second flywheel are preferably movable relative to each other about the common axis of the flywheels with different freedoms of angular movement.

That part of the housing or casing of the friction clutch which extends in the direction of the common axis of the flywheels can form part of the friction generating device. Furthermore, the aforementioned mass of the first flywheel can form part of the friction generating device or of one of several friction generating devices. If the mass of the first flywheel and the axially extending portion of the clutch housing are parts of the friction generating device and the mass at least partially surrounds the axially extending portion of the housing (or vice versa), such friction generating device can include at least one shoe which is at least close to the region where the mass and the axially extending portion of the housing overlie each other.

The friction generating device can comprise at least one energy storing element, and such energy storing element can be stressed in a direction substantially radially of the common axis of the flywheels.

The at least one shoe of the friction generating device can be carried by the first flywheel. For example, the at least one shoe can be clamped or mechanically or otherwise connected to the first flywheel in different ways.

If the friction generating device employs a plurality of shoes, they are or they can be spaced apart from each other in the circumferential direction of the flywheels.

The single shoe or each shoe of the friction generating device can have a friction generating portion of a suitable plastic material.

The clutch spring and/or the clutch disc of the friction clutch can be provided with one or more passages for a suitable coolant, e.g., atmospheric air. Adequate cooling of the friction clutch prolongs the useful life of the clutch and of the entire torque transmitting apparatus. One or more passages for a coolant can also be provided in the housing, e.g., in the aforementioned axially extending portion of the housing and/or in the radially extending bottom wall or end wall of the housing. Still further, the first and/or the second flywheel can be provided with one or more coolant-conveying passages. The passage or passages of the second flywheel are or can be disposed radially outwardly of the chamber for the energy storing elements of the at least one damper.

For example, the distribution of passages can be such that the second flywheel is provided with one or more passages radially outwardly of the chamber and that the clutch disc is provided with one or more passages. Such passages serve to establish one or more paths for the flow of coolant through the clutch disc, along the single wall or along at least one wall of the enclosure, through the second flywheel and toward the first flywheel. Alternatively or in addition to the just-mentioned path or paths, the first flywheel can be provided with one or more passages to establish one or more paths for the flow of coolant along the single wall or along at least one wall of the enclosure and along the second flywheel. The just-mentioned passage or passages of the first flywheel, or one or more additional passages of the first flywheel, are preferably designed to establish one or more paths for the flow of coolant through the first flywheel and directly or indirectly against the second flywheel. Since the latter preferably constitutes or includes the counterpressure plate of the friction clutch, it is heated in response to repeated engagement and disengagement of the clutch and any overheating of the second flywheel could adversely affect the bearing and/or the lubricant in the chamber for the energy storing elements of the at least one damper.

At least one side of at least one of the flywheels is preferably enlarged, e.g., by grooving, by the provision of protuberances or in any other suitable way to ensure the dissipation of large amounts of heat. It is particularly desirable and advantageous to enlarge that side or surface of the second flywheel which faces away from the clutch disc, i.e., which is located opposite the friction surface of the second flywheel if the latter constitutes the counterpressure plate of the friction clutch.

Analogously, that surface of the pressure plate in the friction clutch which faces away from the clutch disc is or can be enlarged to dissipate larger amounts of heat. The other surface of the pressure plate is or can constitute the friction surface or one of two friction surfaces of the clutch.

The friction clutch and/or the enclosure for the energy storing elements of the at least one damper and/or at least one of the flywheels can be provided with one or more substantially vane- or blade-like air circulating portions.

The flywheels and the friction clutch (inclusive of the clutch disc) can be assembled into a module which is ready to be fastened to the output element of a prime mover by means of the aforementioned bolts or in any other suitable way. The bolts or other suitable fasteners can be installed in the module, preferably in such a way that they are non-separably confined in the module in optimum positions for attachment to the output element of the prime mover.

The improved apparatus can employ a push-type or a pull-type friction clutch.

If the apparatus employs means for limiting the magnitude of torque which the at least one damper transmits between the flywheels, such torque limiting means can be mounted to be at least substantially coplanar with the energy storing elements of the at least one damper and with the second flywheel.

The chamber which is defined by the aforediscussed enclosure is or can constitute a substantially annular chamber with a radially outer portion or compartment for the energy storing elements of the at least one damper.

The bearing can be mounted in such a way that it is at least substantially coplanar with the second flywheel, with the energy storing elements of the at least one damper and with the torque limiting means. Such torque limiting means can be disposed radially outwardly of the energy storing elements of the at least one damper and radially inwardly of the second flywheel.

Another feature of the invention resides in the provision of a torque transmitting apparatus which comprises: a first flywheel connectable to a rotary output element; a second flywheel which is rotatable with and relative to the first flywheel about a common axis and is connectable with a rotary input element by a friction clutch; means for opposing rotation of the flywheels relative to each other, including at least one damper having energy storing means disposed, at least in part, in a chamber of an enclosure; and means for limiting the magnitude of torque which is being transmitted from the second flywheel to the friction clutch. The first flywheel includes a portion which transmits torque from the output element to the energy storing means and the enclosure includes at least one wall receiving torque from the energy storing means in response to rotation of the first flywheel. The torque limiting means comprises at least one friction generating member (such as a brake shoe) disposed between the enclosure and the second flywheel, at least in part, radially outwardly of the energy storing means and, at least in part, radially inwardly of a friction surface of the clutch.

A further feature of the invention resides in the provision of a torque transmitting apparatus which comprises first and second flywheels rotatable with and relative to each other about a common axis, and means for opposing rotation of the flywheels relative to each other including at least one damper having at least one coil spring which has an end convolution and at least one additional convolution. The at least one damper further comprises an input member which is driven by one of the flywheels, which engages the end convolution and which is configured in such a way that it can transmit torque to the end convolution without appreciably changing the orientation of the end convolution relative to the at least one additional convolution in response to rotation of the one flywheel. The at least one damper also comprises at least one output member which serves to transmit torque from the at least one coil spring to the other flywheel in response to rotation of the one flywheel.

An additional feature of the invention resides in the provision of a torque transmitting apparatus comprising: first and second flywheels which are rotatable with and relative to each other about a common axis; a bearing between the flywheels; means for fastening the first flywheel to a rotary output element; and a friction clutch which serves to connect the second flywheel with a rotary input element. The friction clutch has an annular friction surface and the input element has a profile which is disposed at a first radial distance from the common axis of the flywheels when the clutch connects the second flywheel with the input element. The apparatus further comprises means for opposing rotation of the flywheels relative to each other, including at least one damper having energy storing means, an input member between the first flywheel and the energy storing means, and an output member between the energy storing means and the second flywheel. The apparatus still further comprises an enclosure which defines a chamber for a portion of, or the entire energy storing means. The bearing is disposed at a second radial distance from the common axis of the flywheels, the fastening means is disposed at a third radial distance from the common axis, a first portion of the enclosure is disposed at a fourth radial distance from the common axis, the energy storing means is disposed at a fifth radial distance from the common axis, a second portion of the enclosure is disposed at a sixth radial distance from the common axis, and the friction surface of the clutch is disposed at a seventh radial distance from the common axis. At least four of the first, second, . . . seventh distances are different from each other.

A further feature of the invention resides in the provision of a torque transmitting apparatus which comprises first and second flywheels rotatable with and relative to each other about a common axis, and means for opposing rotation of the flywheels relative to each other, including at least one damper which comprises at least one coil spring having an end convolution with a first pitch and at least one additional convolution having a second pitch that at least approximates the first pitch. The at least one damper further comprises at least one input member which is driven by one of the flywheels and serves to transmit torque to the end convolution of the at least one coil spring without appreciably changing the first pitch. The at least one damper also comprises at least one rotary output member which serves to transmit torque from the at least one coil spring to the other flywheel in response to rotation of the one flywheel.

An additional feature of the invention resides in the provision of a torque transmitting apparatus comprising: an engageable and disengageable friction clutch, including a pressure plate rotatable about and movable in the direction of a predetermined axis; a driven counterpressure plate (e.g., a flywheel) which is coaxial with and rotates the pressure plate; and means for biasing the pressure plate axially toward the counterpressure plate in the engaged condition of the clutch. The biasing means comprises a diaphragm spring having at least one opening and the pressure plate has at least one projection which is received in the at least one opening in at least one of the engaged and disengaged conditions of the clutch.

Another feature of the invention resides in the provision of a torque transmitting apparatus which comprises: a friction clutch including a rotary pressure plate; a rotary housing or casing coaxial with the pressure plate and having a first side confronting the pressure plate and a second side facing away from the pressure plate; and means for coupling the pressure plate to the housing with freedom of movement in the direction of the common axis of the housing and pressure plate. The coupling means comprises leaf springs; and at least a portion of each leaf spring is disposed at the second side of the housing.

An additional feature of the invention resides in the provision of a torque transmitting apparatus which comprises first and second flywheels rotatable with and relative to each other about a common axis, and means for opposing rotation of the flywheels relative to each other, including a friction generating device which comprises at least one shoe with first and second friction surfaces disposed at different radial distances from the common axis of the flywheels.

Another feature of the invention resides in the provision of a torque transmitting apparatus which comprises first and second flywheels rotatable with and relative to each other about a common axis, and means for opposing rotation of the flywheels relative to each other, including a friction generating device and a damper having energy storing elements interposed between the flywheels and acting in a direction circumferentially of the flywheels. The energy storing elements, one of the flywheels and the friction generating device are at least closely adjacent a plane which is normal to the common axis of the flywheels.

BRIEF DESCRIPTION OF THE DRAWINGS

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawings, wherein:

DESCRIPTION OF PREFERRED EMBODIMENTS

Figure 1:
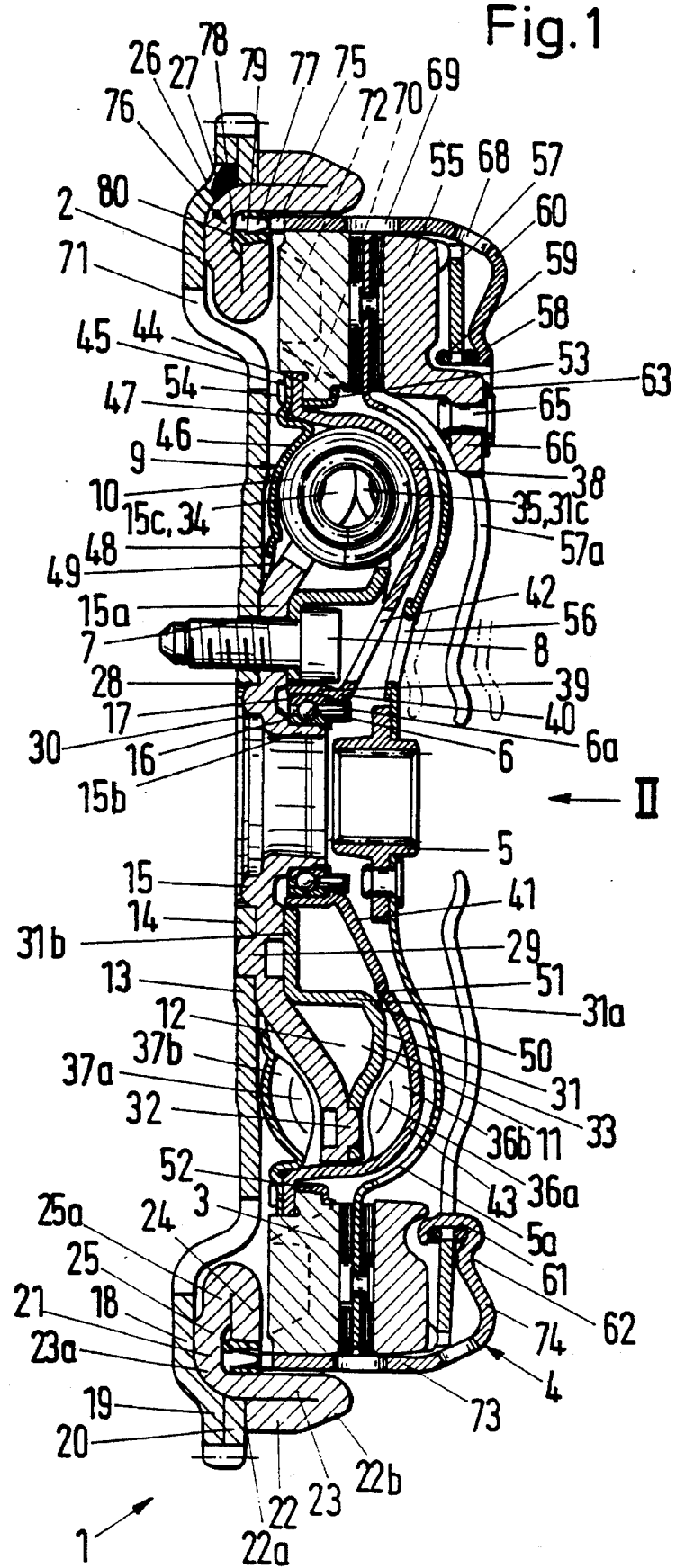
FIG. 1 is an axial sectional view of a torque transmitting apparatus which embodies one form of the invention.
Figure 2:
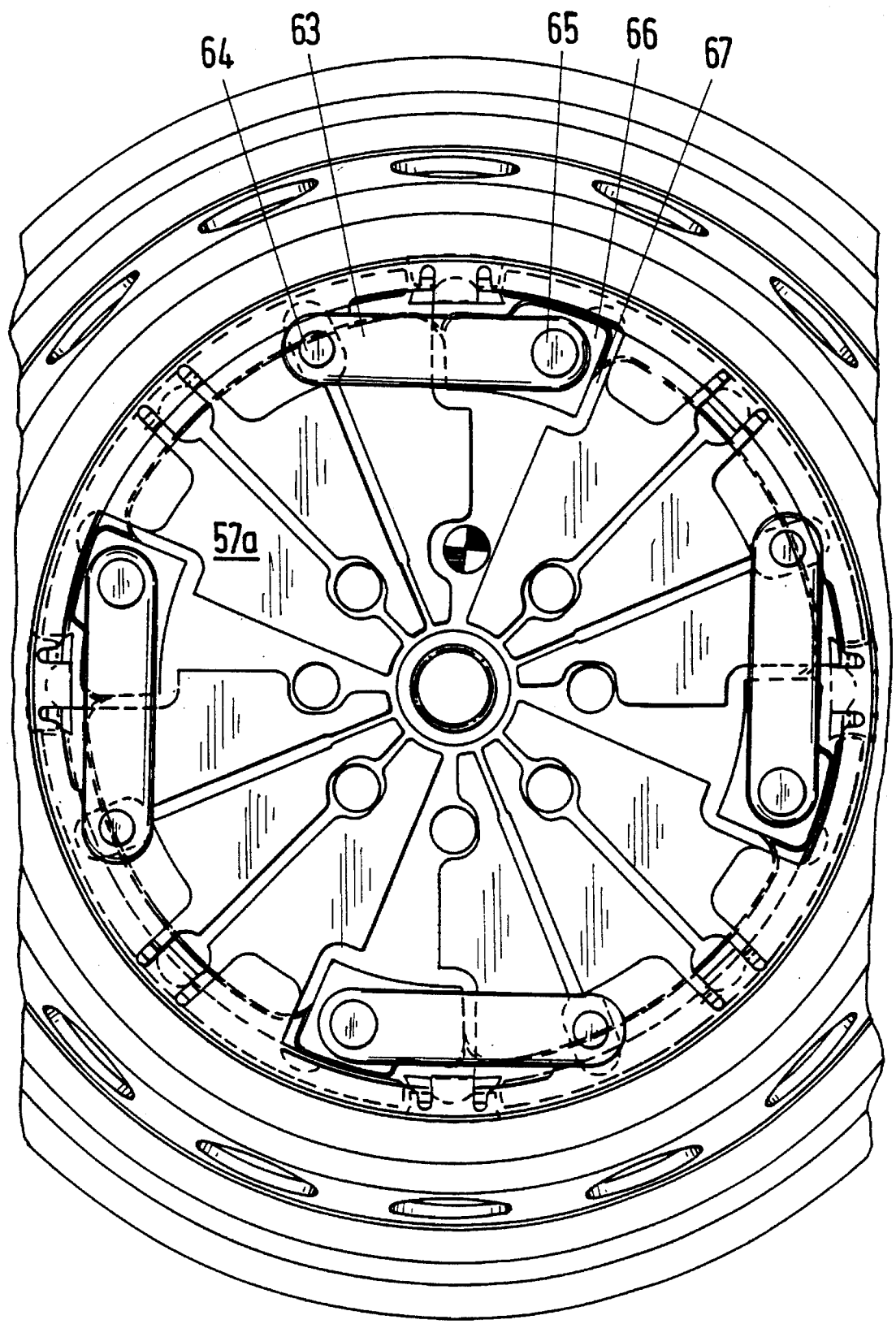
FIG. 2 is a fragmentary elevational view substantially as seen in the direction of arrow II in FIG. 1.

FIGS. 1 and 2 illustrate certain details of a torque transmitting apparatus which can be installed in the power train between the prime mover (e.g., an internal combustion engine or an electric motor) and the wheels of a motor vehicle. For example, the apparatus can be installed between the rotary output element (e.g., a camshaft or a crankshaft) of a combustion engine and the rotary input element (e.g., a shaft) of a variable-speed transmission. Reference may be had, for example, to commonly owned U.S. Pat. No. 4,989,710 granted Feb. 5, 1991 to Reik et al.; this patent shows an engine, the rotary output element of the engine, a transmission and the rotary input element of the transmission.

The apparatus comprises a composite flywheel 1 including a first or primary flywheel 2 which can be separably affixed to the output element of the prime mover, and a second or secondary flywheel 3 which is rotatable with and relative to the primary flywheel 2 about a common axis X—X. The secondary flywheel 3 can transmit torque to the input element of the transmission by way of a friction clutch 4 having a clutch disc or clutch plate 5 which is clamped between a friction surface 3a of the flywheel 3 and a friction surface 55a of an axially movable and rotatable pressure plate 55 of the clutch 4 when the latter is engaged, namely when the pressure plate 55 is biased axially toward the secondary flywheel 3. The secondary flywheel 3 constitutes the counterpressure plate of the clutch 4, and the hub 5a of the clutch disc 5 has an internal profile (e.g., a profile including axially parallel alternating internal teeth and splines) which is complementary to and non-rotatably surrounds the external profile of the input element of the transmission so that such input element is compelled to rotate with the clutch disc 5 when the clutch 4 is properly engaged.

The illustrated clutch disc 5 is relatively simple in that it merely comprises the hub 5a and a substantially disc-shaped portion which surrounds and extends radially outwardly from the hub 5a into the space between the friction surfaces 3a, 55a of the secondary flywheel 3 and the pressure plate 55. Reference may be had, for example, to commonly owned U.S. Pat. No. 5,161,660 granted Nov. 10, 1992 to Huber which discloses a more sophisticated clutch disc with two sets of friction linings disposed at opposite sides of a carrier which can transmit torque from the friction linings to the hub by one or more dampers. It is also possible to install springs between the friction linings and the respective sides of the carrier of friction linings; such springs yield and store energy during engagement of the clutch to thus establish an even more reliable frictional engagement between the friction linings of the clutch disc 5 and the friction surfaces 3a, 55a of the pressure plate and the counterpressure plate.

The apparatus further comprises an antifriction or roller bearing 6 which is installed between the radially inner portions of the flywheels 2, 3 radially inwardly of an annulus of threaded members 8 (hereinafter called bolts for short) which constitute the means for separably affixing or securing the flywheel 2 (and hence the entire torque transmitting apparatus) to the rotary input element of the prime mover. The illustrated bearing 6 comprises a single row of rolling elements in the form of spheres; however, it is equally within the purview of the invention to employ a different (e.g., a more complex) antifriction bearing with rolling elements in the form of needles, balls, barrels or the like. Furthermore, it is also possible to employ a composite bearing including for example a discrete first antifriction bearing and a discrete second antifriction bearing which may, but need not, be identical with the first bearing.

The bearing 6 of FIG. 1 is provided with a sealing element or cap 6a which confines a mass of suitable lubricant (e.g., grease) between the inner and outer races of the bearing. Furthermore, the sealing element 6a can constitute a heat barrier which prevents an excessive transfer of heat from the secondary flywheel 3 to the bearing 6. The secondary flywheel 3 is likely to be heated to an elevated temperature in response to the repeated engagement and disengagement of the friction clutch 4, i.e., in response to repeated engagement of the friction surface 3a with and in response to repeated disengagement of such friction surface from the adjacent portion of the clutch disc 5.

The apparatus of FIGS. 1 and 2 further comprises means for opposing rotation of the flywheels 2 and 3 relative to each other, and such opposing means includes a damper 9 having an annulus of energy storing elements in the form of coil springs 10. The springs 10 are confined in a radially outer annular portion or compartment 12 of a circumferentially complete chamber 11 disposed between the flywheels 2, 3 and defined by an enclosure including a first wall 38 and a second wall 46. The coil springs 10 constitute presently preferred energy storing elements of the damper 9; however, it is also possible to employ other types of coil springs, torsion springs and/or other energy storing means without departing from the spirit of the invention.

At least a portion of the chamber 11 is filled with a solid or viscous lubricant. For example, the chamber 11 can confine the springs 10 and a body or supply of graphite powder, viscous oil, grease or the like.

The primary flywheel 2 comprises a main section or portion 13 which is or which can be made of suitable metallic sheet material in a stamping, drawing or other available machine. The main section 13 is affixed to the output element of the prime mover (or to a part, not shown, which is driven by the output element) by the bolts 8. This main section comprises a substantially washer-like substantially radially extending portion or part 14 having a radially inner portion secured to a substantially flange-like input member 15 of the damper 9. The substantially radially outwardly extending portion or portions 15a of input member 15 are provided with openings in register with openings or holes or bores 7 in the main section 13 of the primary flywheel 2. The openings of portion(s) 15a permit the externally threaded shanks of the bolts 8 to pass into and through the bores 7 and into tapped bores or holes (not shown) in the rotary output element of the prime mover.

The inner race 16 of the bearing 6 surrounds an axially extending annular portion 15b of the input member 15, and the outer race 17 of the bearing is surrounded by the adjacent portion of the secondary flywheel 3.

The radially outer portion of the part 14 of main section 13 of the primary flywheel 2 merges into an annular washer- or trough-like part 18 which bulges in the direction of the axis X—X toward the prime mover (the latter is assumed to be disposed to the left of the main section 13 of the primary flywheel 2, as viewed in FIG. 1 ). The part 18 merges into an axially extending part which is folded radially of the axis X—X to constitute a twin-layer starter gear 19 of one piece with the main section 13 of the primary flywheel 2. The starter gear 19 is more distant from the prime mover than the left-most portion of the part 18, as viewed in the direction of the axis X—X. The left-hand sheet metal layer of the starter gear 19 merges into the part 18 of the main section 13, and the right hand layer 20 of the gear 19 overlies and abuts the left-hand layer and surrounds an axially parallel portion 23 of a separately produced mass 21 affixed to the section 13 and forming part of the flywheel 2. The gear teeth of the starter gear 19 can be formed subsequent to folding of the two layers of the part 18 in a manner as shown in FIG. 1, i.e., first radially outwardly and thereupon radially inwardly. The making of teeth for the starter gear 19 can be effected in a material removing machine (e.g., a milling or broaching machine) or by simply displacing selected portions of the material of the overlapping layers which are to form the starter gear. Thus, instead of actually removing material from the layers forming part of the starter gear 19, it is possible to merely cause the material of selected portions of these layers to flow and to thus provide an annulus of gear teeth. Still further, it is possible to make the gear teeth in a stamping machine or press, or to resort to one or more high-energy beams (such as laser beams) which are trained upon the material of a blank to be converted into the primary flywheel 2 or onto the two layers (including the layer 20) of the suitably deformed radially outer part 18 of the main section 13.

It is often desirable to harden the layers of the starter gear 19 and/or the adjacent portion or portions of the primary flywheel 2. Such localized or selective hardening can be carried out, for example, in an induction hardening or in a case hardening or carburizing machine.

The mass 21 serves to increase the mass moment of inertia of the primary flywheel 2. Such mass constitutes a ring which is made of metallic sheet material and is welded or otherwise bonded, as at 27, to the part 18 of the primary section 13 of the flywheel 2. The illustrated mass 21 has a substantially L-shaped cross- sectional outline and constitutes a converted sheet metal blank originally having a washer-like shape. Reference may be had, for example, to commonly owned German patent application No. P 43 15 209 corresponding to U.S. application Ser. No. 08/230,910, filed Apr. 21, 1994 which describes and shows the manner of converting a sheet metal blank into a ring-shaped body or mass suitable for attachment to the main section 13 of the primary flywheel 2 and which further discloses a suitable method of making a laminated starter gear. At least the relevant passages of this German patent application and/or of corresponding application(s) in other countries are incorporated herein by reference.

The mass 21 comprises two substantially cylindrical overlapping portions 22, 23 which actually abut each other and surround and center an axially parallel portion 73 of a housing or cover 60 forming part of the friction clutch 4. The radially outer cylindrical portion 22 of the mass 21 is shorter than the radially inner portion 23 and abuts the adjacent layer 20 of the starter gear 19. The locus of abutment of the portion 22 against the layer 20 is shown at 22a. The dimensions and the configuration of the flywheel 2, its starter gear 19, the mass 21 and the clutch housing 60 are or can be selected in such a way that these parts can be readily introduced into a transmission case, not shown, e.g., into a substantially bell-shaped transmission case which confines the torque transmitting apparatus without touching any of its rotary components.

That part of the mass 21 which extends between the portions 22 and 23 has a frustoconical external surface 22b to facilitate convenient introduction into a transmission case. The external surface 22a can be formed by removing some material of the mass 21 but preferably by displacing some material of the portion 22 and/or 23 to thus promote the hardness of the mass 21. In the embodiment of FIGS. 1 and 2, the making of the conical surface 22b involved a displacement of material of the sheet metal blank in a direction to increase the thickness of the radially outer portion 22.

The radially inner portion 23 of the illustrated mass 21 is surrounded by the layer 20 and in part by the other layer of the starter gear 19 and extends radially inwardly (as at 23a) to merge into one (25) of two substantially radially extending washer-like portions 24, 25 of the mass 21. The portions 23a and 25 of the mass 21 are adjacent and preferably abut the right-hand side of the outer part 18 of the main section 13 of the primary flywheel 2. The reference character 25a denotes in FIG. 1 that part of the mass 21 which connects the radially extending portions 24, 25 to each other adjacent that side of the secondary flywheel 3 which faces away from the friction surface 3a, i.e., which faces away from the friction clutch 4. The radially extending portions 24, 25 of the mass 21 can (and in the embodiment of FIG. 1 actually do) abut each other. The portion 24 extends radially outwardly beyond the portion 25 toward but short of the axially extending portion 23. An annulus of circumferentially spaced apart welded seams 27 is provided in the region of the connection 23a between the portions 23 and 25 of the mass 21 to bond the latter to the main section 13 of the primary flywheel 2. The welded seams 27 are received in recesses or holes 26 which are provided in the part 18 and/or in the adjacent portion of the left-hand layer of the starter gear 19 in order to facilitate the making of the seams 27.

The flange-like input member 15 of the damper 9 receives torque from and is centered on the primary flywheel 2. To this end, the main section 13 of the flywheel 2 is formed with an annular seat 28 which surrounds the adjacent portion of the input member 15. Alternatively, or in addition to the seat 28, the input member 15 can be centered by and at the same time non-rotatably connected to the main section 13 of the flywheel 2 by a set of protrusions 29 forming part of the member 15 and received in complementary recesses, holes or sockets of the main section 13. The protrusions 29 can be formed by displacing selected portions of the input member 15 in the direction of the axis X—X by resorting to one or more material displacing tools acting upon that side of the input member 15 which faces away from the flywheel 2 and the prime mover.

The input member 15 can further serve to center the composite flywheel 1 on the output element of the prime mover. To this end, the radially inner portion of the input member 15 constitutes or is connected with a centering seat 30 which can mount the composite flywheel 1 on the output element of the prime mover or on another part which receives torque from and is coaxial with the output element. For example, the seat 30 can be applied around the crankshaft of a combustion engine which drives the primary flywheel 2 when the torque transmitting apparatus of FIGS. 1 and 2 is in use.

The input member 15 comprises a portion 15a which extends radially outwardly from the seat 30 and merges into a hollow conical portion diverging radially outwardly of the axis X—X in a direction away from the main section 13 of the flywheel 2. The hollow conical portion of the input member 15 merges into a substantially radially outwardly extending portion which is rigidly connected to the radially outer portion of a second substantially flange-like input member 31 of the damper 9. The connection between the input members 15 and 31 includes a set of protrusions 32 which constitute displaced portions of the material of the member 15 extending into complementary recesses, holes or seats of the member 31. The radially outer portion of the input member 31 extends substantially radially inwardly toward the axis X—X to merge into a slightly dished portion 33 which extends away from the main section 13 of the flywheel 2. The portion 33 merges into a portion 31a which extends in parallelism with the axis X—X toward the prime mover and merges into a radially inwardly extending portion 31b. The portion 31b is adjacent the radially extending portion 15a of the input member 15, and the portion 31b is also provided with openings in register with similar openings in the portion 15a as well as with the holes, bores or openings 7 of the main section 13 of the flywheel 1. This renders it possible to readily introduce the shanks of the bolts 8 through the portion 31b of the input member 31, through the portion 15a of the input member 15, through the holes 7 of the main section 13 and into the tapped bores or holes of the output element of the prime mover which is to drive the flywheel 2. The right-hand side of the portion 31b of the input member 31 serves as an abutment or stop for the heads of the bolts 8 and is contacted by such heads when the attachment of the flywheel 2 to the output element of the prime mover is completed.

The radially outer portion 31c of input member 31 defines substantially radially outwardly extending arms 35 which directly contact the end convolutions of, and transmit torque to, the energy storing springs 10 of the damper 9 in response to rotation of the primary flywheel 2. Analogously, the radially outer portion 15c of the input member 15 is provided with arms 34 which extend radially outwardly into engagement with the adjacent outermost or end convolutions of the springs 10 in the radially outer portion or compartment 12 of the chamber 11 which is defined by the walls 38 and 46 of the aforementioned enclosure. The arms 34 are adjacent the dished portion 33 of the input member 31.

Figure 3:
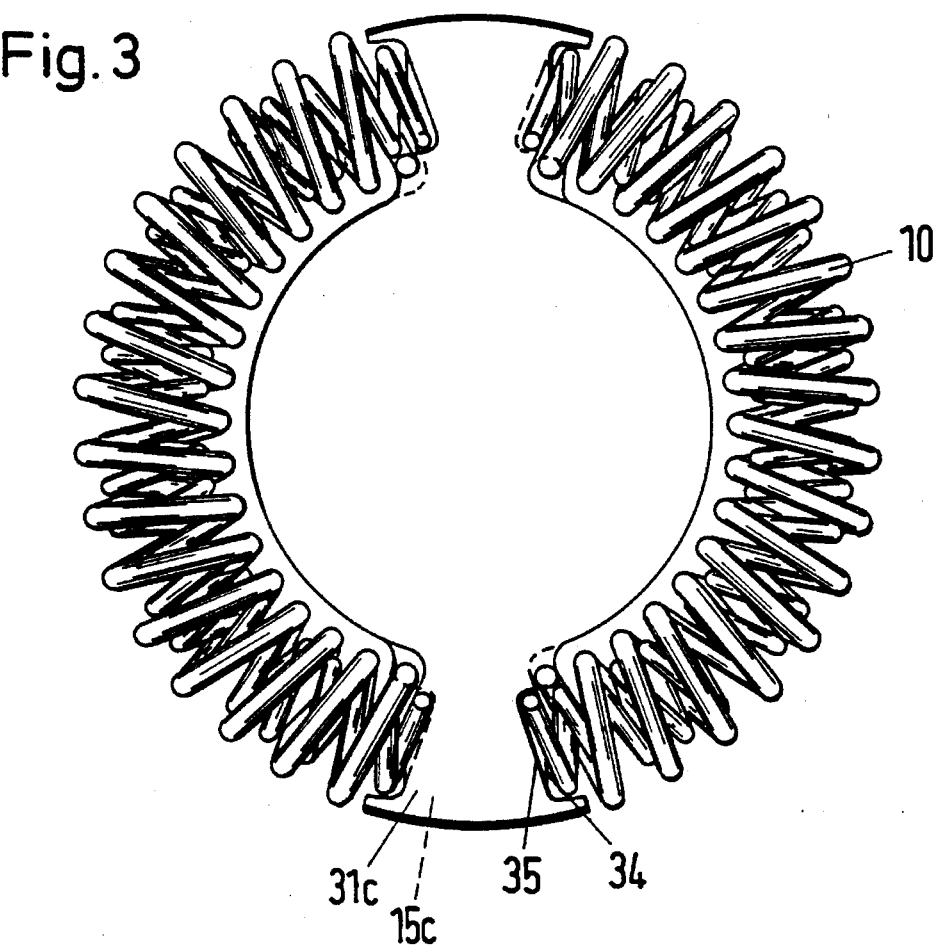
FIG. 3 an elevational view of the energy storing elements forming part of a damper in the apparatus of FIGS. 1 and 2.

As can be best seen in FIGS. 1 and 3, the damper 9 comprises two composite coil springs 10 including a first spring 10a and a second spring 10b which is at least substantially confined in the respective spring 10a. The arms 34, 35 of the input members 15, 31 extend radially outwardly into the chamber 11 and into the spaces between the end convolutions of the springs 10. These springs store energy in response to rotation of the flywheels 2 and 3 relative to each other, i.e., the springs 10 act in the circumferential direction of the composite flywheel 1.

The end convolutions of each outer spring 10a can be closely adjacent (e.g., substantially coplanar with) the end convolutions of the respective inner springs 10b. This can be readily seen in FIG. 3 which further shows that the arms 34, 35 do not exactly overlie each other. The configuration of the arms 34 and 35 is such that they need not alter the orientation (pitch) of the adjacent end convolutions of the springs 10a and 10b relative to the respective adjacent intermediate or additional convolutions. This is desirable and advantageous because it is not necessary to precision finish the end convolutions of the springs 10a and 10b, such as by removing surplus material, changing the orientation of the end convolutions and/or other treatments which are necessary in order to finish the end convolutions of coil springs. The arms 34, 35 which are shown in FIG. 3 can be said to constitute stepped composite abutments for the corresponding coil springs 10a, 10b to ensure reliable and predictable transmission of torque from the flywheel 2 to the composite springs 10 and thence to the secondary flywheel 3 when the improved torque transmitting apparatus is in actual use. Otherwise stated, the configuration of those edge faces of the arms 34, 35 which abut the adjacent end convolutions of the springs 10a, 10b are designed to conform to the orientation of such end convolutions rather than the other way around.

The end convolutions of the springs 10a, 10b which are shown in FIG. 3 have ends which are obtained by the simple expedient of subdividing longer coil springs having requisite diameters into shorter sections or springs by making cuts in planes including the axes of the longer springs. The end convolutions do not abut the neighboring intermediate or additional convolutions of the respective springs 10a and 10b. Thus, it is not necessary to grind or otherwise treat the ends of the end convolutions so that the treated ends will have faces located in planes extending at right angles to the axes of the respective springs. It is also not necessary to deform the end convolutions so as to move them into actual contact with the immediately adjacent intermediate or additional convolutions. Otherwise stated, all convolutions of each spring 10a or 10b can have an identical pitch or lead, not unlike the threads of a bolt or another externally threaded fastener.

An advantage of the just-outlined design of the springs 10a and 10b is that they can be mass-produced at a reasonable cost, as well as that they can undergo a more pronounced axial stressing than conventional coil springs with end convolutions finished and oriented in the aforedescribed conventional manner. Thus, the end convolutions of the springs 10a and 10b can also yield before they actually engage the adjacent intermediate or additional convolutions so that the conversion of a spring 10a or 10b into a solid block with abutting convolutions requires a relatively large angular displacement of the flywheels 2 and 3 relative to each other. The springs 10a, 10b do not have or need not have any convolutions which already abut the neighboring convolutions prior to the application of a stress in a direction to reduce the length of such springs. Thus, the capacity or ability of the springs to permit greater angular displacement of the flywheels 2, 3 relative to each other is enhanced over that of conventional coil springs by the simple expedients of properly configurating and mounting the arms 34, 35 of the input members 15, 31 and by avoiding any initial deformation of the end convolutions into actual contact with the immediately adjacent intermediate or additional convolutions. Such advantages are achieved by actually simplifying the making of the springs 10a, 10b, i.e., it is possible to dispense with grinding or other treatment of the ends of end convolutions as well as to dispense with initial changes of orientation of the end convolutions into abutment with the neighboring convolutions.

The just-described feature of configurating the arms 34, 35 and the coil springs 10a, 10b can be resorted to with equal or similar advantage in numerous heretofore known torque transmitting apparatus, e.g., in those disclosed in the aforementioned commonly owned U.S. Pat. No. 4,989,710 to Reik et al. and, therefore, such feature is deemed to warrant patent protection with, as well as independently of, other novel features of the improved torque transmitting apparatus. For example, the combination of coil springs corresponding to the springs 10a, 10b and input members (or output members) corresponding to the members 15, 31 with arms 34 and 35 can be put to use in torque transmitting apparatus employing a single flywheel and/or in dampers which employ coil springs forming an annulus of discrete coil springs rather than sets of two or more coil springs which partially or completely surround each other. Furthermore, the number of discrete springs or sets of two or more springs located one within the other can be increased to three or more without departing from the spirit of the invention.

It is further possible to replace the two discrete input members 15, 31 with a single input member which receives torque from the flywheel 2 (i.e., from the output element of a suitable prime mover) transmits the torque to springs in a manner substantially as shown in and as described with reference to FIG. 3. For example, the input members 15, 31 (or a single input member replacing the members 15, 31 ) can be made of a suitable sintered material or they can constitute stampings or forgings.

It is further possible to design the input members 15, 31 (or a single input member which replaces the members 15, 31 ) in such a way that the arms 34, 35 not only properly engage more or less unfinished end convolutions of the springs 10a, 10b but that they also serve to prevent rotation of the springs 10a, 10b about their respective axes. This is often desirable and advantageous because the thus modified or designed arms 34, 35 ensure that the respective springs 10a, 10b remain in optimal angular positions as selected by the manufacturer in the plant in which the torque transmitting apparatus is assembled. For example, twisting of one end of a spring 10a or 10b relative to the other end can result in undesirable changes of certain important characteristics of such springs in actual use. Twisting could result in changes of orientation of the end convolutions relative to the neighboring convolutions and/or in unsatisfactory contact between the arms 34, 35 and the adjacent end convolutions.

The wall 38 of the aforementioned enclosure which defines the chamber 11 and its compartment 12 for the springs 10 constitutes one output member of the damper 9. The radially outer portion of the wall 38 comprises arms 36a, 36b which correspond to the arms 34, 35 and engage the neighboring end convolutions of the springs 10a and 10b in the same way or in a manner analogous to that described above with reference to the input members 15, 31 of the damper 9. The wall 46 of the enclosure also comprises arms 37a, 37b which engage the adjacent end convolutions of the springs forming part of the damper 9. The arms 36a, 36b and 37a, 37b may but need not exactly overlie each other as seen in the axial direction of the flywheels 2 and 3, i.e., they can be staggered relative to each other in the circumferential direction of the flywheels, depending on the positions of the end convolutions of the outer springs 10a and the respective inner springs 10b relative to each other.

The walls 38, 46 can be made of metallic sheet material, and the radially innermost portion of the wall 38 surrounds the outer race 17 of the antifriction bearing 6. The radially outer portion of the wall 38 is connected to and supports the secondary flywheel 3. The radially inner portion of the wall 38 is provided with a shoulder 39 which extends in the direction of the axis X—X toward the main section 13 of the primary flywheel 2 and has an inner diameter matching the outer diameter of the heat-insulating cap 6a surrounding the outer race 17 of the bearing 6. That portion of the shoulder 39 which is more distant from the flywheel 2 is of one piece with a radially inwardly extending portion 40 of the wall 38; the portion constitutes a stop and abuts the adjacent side of the bearing 6 so that the bearing and the wall 38 are maintained in predetermined axial positions relative to each other. The wall 38 further comprises a conical portion 41 which has a constant or nearly constant slope and diverges radially outwardly from the radially inwardly extending portion 40 in a direction away from the main section 13 of the flywheel 2.

The conical portion 41 of the wall 38 has openings 42 which can receive the heads of the bolts 8 to maintain the bolts in optimum positions for introduction into the tapped bores or holes of the output element of the prime mover, preferably in such positions that the axes of the bolts 8 are at least substantially parallel to the common axis X—X of the flywheels 2 and 3. The radially outer part of the conical portion 41 merges into a curved portion 43 preferably having a substantially constant radius of curvature and a concave inner side rather closely conforming to the outlines of adjacent portions of the outer springs 10a of the damper 9. Thus, the portion 43 of wall 38 confines portions of the springs 10a in the radial and axial directions of the torque transmitting apparatus. The arcuate portion 43 of the wall 38 merges into a substantially radial outwardly extending portion 44 which is fixedly connected to the radially outer at least substantially radially extending portion 45 of the second wall 46 of the enclosure defining the chamber 11 for the energy storing elements 10a and 10b of the damper 9. A sealing element 47 (e.g., an O-ring) is interposed between the radially outermost portion 44 of the wall 38 and the radially outermost portion 45 of the wall 46 to seal the compartment 12 of the chamber 11 from the surrounding atmosphere.

The radially outer portion 45 of the wall 46 includes an inner part which is surrounded by the sealing element 47 and merges into a tubular or cylindrical portion extending axially and away from the main section 13 of the flywheel 2 into the space which is surrounded by the adjacent portion of the wall 38. This ensures a highly satisfactory sealing of the radially outermost part of the compartment 12 from the surrounding atmosphere. Moreover, the just mentioned cylindrical portion of the wall 46 cooperates with the adjacent portion of the wall 38 to reliably center such walls relative to each other. The next portion of the wall 46 extends substantially radially inwardly and is configured to snugly surround the adjacent portions of the outer springs 10a and to thereupon extend substantially radially inwardly into the space between the main section 13 of the flywheel 2 and the input member 15 of the damper 9.

The wall 46 further comprises a portion 48 which extends to the left (as viewed in FIG. 1) toward the prime mover which drives the flywheel 2 and serves as a retainer for a sealing element 49 here shown as a diaphragm spring which reacts against and sealingly engages the portion 48 and has a radially inner portion bearing against the adjacent portion of the input member 15. Thus, the diaphragm spring 49 serves to seal the corresponding portion of the chamber 11 from the surrounding atmosphere. It is also possible to install the diaphragm spring 49 in such a way that it reacts against the input member 15 and bears against the portion 48 of the wall 46. The wall 46 and/or the input member 15 can be provided with means (not referenced) for properly centering the diaphragm spring 49 between them.

A further sealing element 50, e.g., a diaphragm spring, is provided to seal the chamber 11 radially inwardly between the input member 31 of the damper 9 and the wall 38 of the enclosure defining the chamber 11 and its compartment 12. The radially outer portion of the diaphragm spring 50 reacts against the portion 33 of the input member 31 and its radially inner portion bears against the wall 38 in the region of the portion 31a of the input member 31. The diaphragm spring or sealing element 50 is centered by a set of annularly arranged projections 51 which are provided on the wall 38 and which are or which can be formed by displacing the material of selected portions of the wall 38 in a direction toward the main section 13 of the flywheel 2. The individual projections 51 can be replaced with a circumferentially complete or composite rib of the wall 38. Alternatively, or in addition to centering of the diaphragm spring 50 with the wall 38, it is also possible to center this diaphragm spring 50 with the input member 31 of the damper 9.

The outer portions 44, 45 of the walls 38, 46 are connected to and support and transmit torque to the secondary flywheel 3, i.e., to the counterpressure plate of the friction clutch 4. These outer portions 44, 45 are disposed at that side of the flywheel 3 which faces away from the friction surfaces 3a and 55a. This is desirable and advantageous because, in the event of failure of the sealing element 47, any lubricant which tends to escape from the compartment 12 of the chamber 11 is directed or deflected toward the primary flywheel 2 and is thus prevented from adversely influencing the action of the friction clutch 4, i.e., from reaching the friction surface 3a and/or 55a and/or the radially outer portion of the clutch disc 5. Thus, when engaged, the clutch 4 can continue to transmit torque from the flywheel 3 to the input element of the transmission in an optimum manner even if some of the lubricant or the entire body of lubricant happens to escape from the chamber 11.

The connection between the portions 44, 45 of the walls 38, 46 and the secondary flywheel 3 comprises a suitably shaped or corrugated sheet metal member 52 having a radially outwardly extending portion 53 which overlies the right-hand side of the flywheel 3 radially inwardly of the friction surface 3a, and more specifically radially inwardly of that portion of the friction surface 3a which is disposed radially inwardly of the adjacent set of friction linings (if any) on the radially outer portion of the clutch disc 5 between the friction surfaces 3a and 55a. The left-hand portion of the connecting member 53 extends through suitable openings (not referenced) in the radially outer portions 44 and 45 of the walls 38 and 46, respectively. The connecting member 52 further comprises tongues 54 which are bent radially outwardly to overlie the left-hand side of the radially outer portion 45 of the wall 46 and to thus couple the portions 44, 45 of the walls 38, 46 to each other. At the same time, the tongues 54 secure the portions 44, 45 of the walls 38, 46 to the radially inner portion of the flywheel 3. The tongues 54 are bent radially outwardly against the outer side of the portion 45 of the wall 46 when the assembly of the walls 38, 46 with the secondary flywheel 3 is completed. Prior to deformation, the tongues 54 preferably extend in parallelism with the axis X—X so that they can ready advance through the aforementioned openings or slots in the radially outer portions 44, 45 of the walls 38 and 46.

The composite flywheel 1 including the flywheels 2 and 3 is preferably assembled with the friction clutch 4 (inclusive of the clutch disc 5) to form a prefabricated module which can be readily assembled at the manufacturing plant for convenient storage or shipment to the locale of use and for equally convenient attachment to the output element of a prime mover which is to drive the flywheel 2. This renders it possible to dispense with a number of operations which are necessary in connection with the assembly, shipment and mounting of heretofore known torque transmitting apparatus. For example, it is no longer necessary to insert the clutch disc 5 between the flywheel 3 and the pressure plate 55 at the locale of actual use, to center the thus inserted clutch disc 5 relative to the friction surfaces 3a and 55a, to mount the friction clutch 4 on the flywheel 3, to center the composite flywheel 1 on the output element of the prime mover by a mandrel or the like, to withdraw the centering mandrel, and to individually introduce the bolts into the holes 7 of the primary flywheel 2 prior or subsequent to extraction of the centering mandrel.

The bolts 8 are preferably assembled with the composite flywheel 1 and with the clutch 4 to constitute component parts of the aforementioned module and to thus further simplify the task of the persons or robots in charge of affixing the primary flywheel 2 to the output element of the prime mover. This can be readily achieved by introducing the shanks of the bolts 8 into the holes or openings 7, the registering openings of the input member 15 and the registering openings of the input member 31 and by dimensioning the openings 42 and 56 in such a way that they permit the advancement of the working end of a tool (e.g., a motorized screw driver) into engagement with the heads of the bolts 8 but to prevent such heads from advancing through the openings 42 and/or 56. It is further possible to insert, for example, into the holes 7, resilient or yieldable parts (not specifically shown) which reliably hold the axes of the bolts 8 in the module in parallelism with the common axis X—X of the flywheels 2, 3 but which yield when the heads of the bolts 8 are engaged by the working end of a tool serving to drive the shanks of the bolts into the aligned tapped bores or holes in the output element of the prime mover.

The openings 42 are provided in or close to the radially inner portion of the wall 38, and the openings 56 are provided close to the hub 5a of the clutch disc 5 so that they are aligned with the openings 42 as well as with the openings in the input members 15, 31 and with the openings or holes 7 in the main section 13 of the flywheel 2. If the openings 42 and/or 56 are too small to permit the heads of the bolts 8 to pass therethrough, the aforementioned resilient or yieldable parts can be dispensed with.

The clutch spring 57 is a diaphragm spring which is installed between the housing 60 and the pressure plate 55 of the friction clutch 4. The radially inwardly extending prongs 57a extend radially inwardly from the circumferentially complete main portion of the clutch spring 57 and certain slots between neighboring prongs 57a are enlarged (e.g., by omitting certain prongs) so as to provide openings for introduction of the working end of a rotary tool into engagement with the heads of the bolts 8. The openings of the clutch spring 57 register with the openings 56 of the clutch disc 5.

The inner side of the radially extending bottom wall or end wall 74 of the housing 60 carries a seat assembly which tiltably supports the main portion of the clutch spring 57 radially outwardly of the prongs 57a. The illustrated seat assembly comprises a ring-shaped seat 58 (e.g., a wire ring) between the clutch spring 57 and the bottom wall 74, and a ring-shaped seat 59 (e.g., a wire ring) at that side of the clutch spring 57 which confronts the pressure plate 55. The seats 58, 59 are held in the illustrated positions by lugs 61 which preferably constitute portions of the bottom wall 74. Such lugs or portions 61 are bent out of the general plane of the bottom wall 74 and are suitably deformed to extend through the slots between the prongs 57a of the clutch spring 57 and to overlie that side of the seat 59 which faces away from the bottom wall 74. The arrangement is preferably such that the lugs 61 overlie the left-hand side as well as the radially inner side of the seat 59 so that the latter is reliably held in a position of exact alignment with the seat 58, i.e., against any movement in the direction of the axis X—X as well as against any movement radially of such axis.

The seat 58 is held in a predetermined position relative to the axis X—X and housing 60 by a circumferentially complete or interrupted rib or corrugation 62 which constitutes an axially displaced portion of the bottom wall 74 of the housing 60. The interrupted rib or corrugation 62 can be replaced with an even simpler centering device for the seat 59, e.g., with a relatively small number of individual projections which are applied to or extend from the inner side of the bottom wall 74 to ensure that the center of the seat 58 is located on the axis X—X.

As can be seen in FIG. 1, the right-hand side of the pressure plate 55 is configurated in such a way that it includes a portion having an outline which is complementary to the outline of the seats 58, 59 for the main portion of the clutch spring 57. Thus, the seat 59 can extend into a circumferentially extending groove or recess in the right-hand side of the pressure plate 55, at least when the clutch 4 is disengaged and the pressure plate 55 is shifted away from the clutch disc 5, i.e., when the pressure plate is moved axially toward the bottom wall 74 of the housing 60. The groove or recess in the right-hand side of the pressure plate 55 shown in FIG. 1 is dimensioned in such a way that it can receive the seat 59 as well as the adjacent portions of the lugs 61. It is also possible to replace the illustrated groove or recess with a series of discrete recesses each of which serves to receive the adjacent portion of a lug 61 in the disengaged condition of the friction clutch 4.

The means for transmitting torque from the secondary flywheel 3 to the pressure plate 55 of the friction clutch 4 (and more specifically from the housing 60 to the pressure plate 55) comprises a set of leaf springs 63. As can be best seen in FIG. 2, one end portion of each leaf spring 63 is secured to the housing 60 by a rivet 64, and the other end of each leaf spring is secured to the pressure plate 55 by a rivet 65. The leaf springs compel the pressure plate 55 to share all rotary movements of the housing 60 (i.e., of the flywheel 3) but the pressure plate is free to move in the direction of the axis X—X to frictionally engage the clutch disc 5 (clutch 4 engaged) or to permit rotation of the clutch disc and the flywheel 3 relative to each other (clutch disengaged). The rivets 65 are adjacent projections 66 forming part of the pressure plate 55 and extending toward the axis X—X radially inwardly of the friction surface 55a. The projections 66 further extend in the direction of axis X—X toward and through openings 67 which are provided therefor in the clutch spring 57. This renders it possible to rivet (at 64) the leaf springs 63 to that side of the bottom wall 74 of the housing 60 which faces away from the clutch spring 57 and pressure plate 55. This novel feature, which contributes significantly to the compactness of the friction clutch 4, can be embodied in the illustrated friction clutch 4 as well as in numerous other types of friction clutches; therefore, such feature is deemed to be novel and patentable per se. Moreover, the just-described mode of connecting the pressure plate of a friction clutch to a flywheel (in the present instance by way of the clutch housing 60 which rotates with the flywheel 3) can be resorted to irrespective of whether the clutch receives torque from a prime mover by way of a single flywheel or by way of a composite flywheel with one or more dampers between them.

As can be seen in FIG. 2, the openings 67 can be formed by omitting or removing certain prongs 57a of the clutch spring 57, i.e., the width of each opening 67 can match the combined width of two relatively narrow slots 57b plus the width of a (deleted or removed) prong 57a. It is equally possible to form the necessary openings 67 (which permit the projections 66 of the pressure plate 55 to pass therethrough) by increasing the width of certain slots 57b by removing material from one or both neighboring prongs 57a so that the thus increased widths of such slots suffice to enable a projection 66 to extend through the clutch spring 57. The configuration of the clutch spring 57 can be such that its prongs 57a are at least substantially parallel to the adjacent portions of the carrier, which supports the friction linings and forms part of the clutch disc 5, when the clutch 4 is disengaged.

The aforementioned openings 42 of the wall 38 and the openings 56 in the clutch disc 5 serve the aforediscussed purpose of permitting the passage of the working end of a tool into engagement with the heads of the bolts 8, and preferably also the additional purpose of permitting circulation of a coolant, normally atmospheric air, in order to prevent overheating of the secondary flywheel 3, of the body of lubricant in the chamber 11 and of certain other parts of the torque transmitting apparatus (such as the bearing 6, the primary flywheel 2 and the energy storing elements 10). The cooling action is further enhanced as a result of the provision of additional passages or channels 68 and 69 in the housing 60, passages or channels 5b in the clutch disc 5, passages or channels 70 in the secondary flywheel 3, and passages or channels 71 in the main section 13 of the primary flywheel 2. These passages establish paths for the flow of cooling air in order to remove heat from the flywheels 2, 3, from the input members 15, 31, from the walls 38, 46, from the clutch disc 5 and its friction linings (if any), as well as from the housing 60, clutch spring 57 and pressure plate 55 of the clutch 4. As mentioned above, adequate cooling of the enclosure including the walls 38, 46 is of considerable importance in order to avoid overheating of the body of lubricant in the chamber 11, namely to prevent undue reduction of the viscosity of a paste-like or grease-like lubricant, i.e., to prevent the heated lubricant from flowing out of the chamber 11 in the event of failure of one or more aforediscussed sealing elements between the chamber 11 and the surrounding atmosphere.

Adequate cooling of at least some constituents of the torque transmitting apparatus is desirable on the additional ground that it contributes to longer useful life of the entire apparatus.

Additional cooling of certain constituents of the improved apparatus can be achieved by increasing the area of certain parts in order to permit dissipation of larger amounts of heat in actual use of the apparatus. For example, it is desirable to enlarge (at 72) the area of that side or surface of the secondary flywheel 3 which faces away from the friction surfaces 3a and 55a, and to enlarge the area of that side or surface of the pressure plate 55 which faces away from the friction surfaces 3a and 55a. The areas of certain surfaces can be enlarged by providing them with projections and/or recesses, by imparting thereto an undulate shape and/or in any other suitable way. Still further, it is possible to impart to certain parts of at least some of those components, which are provided with one or more passages, configurations which resemble the blades or vanes of a fan in order to further enhance the flow of coolant along and against various parts of the improved torque transmitting apparatus.

The housing or cover 60 of the friction clutch 4 comprises the aforementioned bottom wall or end wall 74 and the aforementioned tubular or cylindrical portion 73 which extends in the direction of the axis X—X and is partially surrounded by the mass 21. The portion 73 surrounds the secondary flywheel 3 and is or can be pinned, riveted, welded and/or otherwise secured to the flywheel 3 so that the latter drives the housing 60, the pressure plate 55 and the clutch spring 57 when it receives torque from the damper 9. Certain additional modes of connecting the housing of a friction clutch to a counterpressure plate (such as a flywheel) are disclosed, for example, in the published German patent application No. 41 17 584.

The tubular or cylindrical portion 73 of the housing 60 includes prongs or tongues 75 which extend beyond the flywheel 3 toward the prime mover and into a space between the radially outermost part of the disc 24 of the mass 21 and the inner side of the portion or layer 23 of the mass 21. Such space between the parts 23 and 24 of the mass 21 accommodates a friction generating device 76 which is controlled by the tongues 75 of the portion 73 of housing 60. The device 76 comprises at least one friction generating member 77 (hereinafter called brake shoe or shoe for short) which can be of the type shown in FIG. 4 (denoted by the character 177) or in FIG. 5. The shoe 77 or 177 comprises at least one plastic part or portion 78 or 178 whose curvature matches or approximates the curvature of the space between the portions 23 and 24 of the mass 21, and the friction generating device 76 further comprises one or more energy storing members 79 or 179 which bias the shoe 77 or 177 radially outwardly. Each shoe 77 or 177 is held against movement in the direction of the axis X—X because it extends into a suitably profiled portion or recess 80 provided in the portion 23 of the mass 21. The recess 80 can be bounded by a surface resembling a hollow cone and having a tip facing toward the prime mover. A complementary conical recess can be provided in the radially extending portion 24 of the mass 21.

Figure 4:
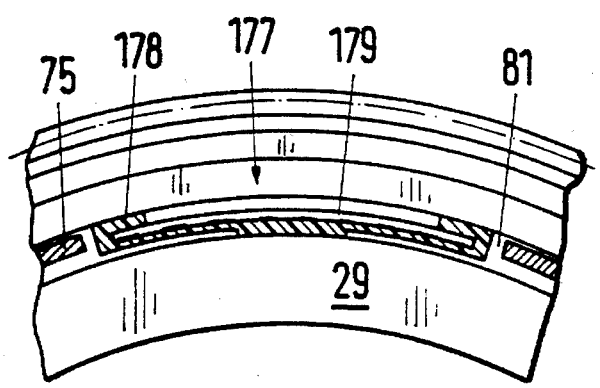
FIG. 4 is a fragmentary sectional view of a friction generating device which can be utilized in the torque transmitting apparatus of the present invention.
Figure 5:
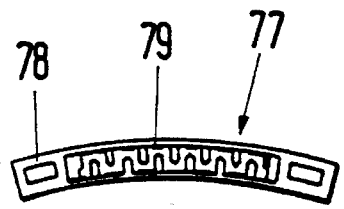
FIG. 5 is a fragmentary sectional view of the friction generating device which is utilized in the apparatus of FIGS. 1 and 2 and constitutes a modification of the friction generating,device of FIG. 4.

The shoe 177 of FIG. 4 is different from the shoe 77 shown in FIGS. 1 and 5 in that its plastic portion 178 is stressed by an energy storing member in the form of a piece of round wire 179 which acts not unlike a leaf spring. The plastic portion 178 is originally flat and the wire 179 is straight prior to insertion between the portions 23 and 24 of the mass 21. Thus, the wire 179 is caused to store energy in response to flexing to follow the curvature of the internal surface of the portion 23 of the mass 21, whereby the plastic portion is stressed in the radial direction of the flywheels 2 and 3. FIG. 4 further shows that the tongues 75 of the housing portion 73 are separated from the shoe 177 between them by circumferentially extending gaps or clearances 81. Such clearances enable the mass 21 and the housing portion 73 to turn relative to each other through a predetermined angle before the friction generating device 76 becomes effective.

It is often preferred to provide a friction generating device 76 which employs a plurality of shoes 77 or 177 which alternate with the tongues 75 and define therewith clearances or gaps 81 having different widths (as measured in the circumferential direction of the flywheels 2 and 3). This renders it possible to cause successive or selected shoes 77 or 177 to become effective or operative during different (overlapping or non-overlapping) stages of rotation of the mass 21 and housing portion 73 relative to each other. Such construction of the device 76 ensures a stepped or stagewise development or increase of the friction generating action.

It is also possible to install the shoe or shoes 77 or 177 in such a way that the width of the clearances 81 between the shoe or shoes and the adjacent tongues 75 is reduced to zero, i.e., that the friction generating device is operative during each and every stage of rotation of the flywheel 2 and its mass 21 relative to the housing portion 73.

Still further, it is possible to employ several shoes 77 or 177 and to provide each of the plural shoes 77 or 177 with a plastic portion 78 or 178 which is capable of generating a different amount of friction, i.e., such design of the friction generating device 76 also insures a stepwise or stagewise development of friction between the mass 21 and the housing portion 73. Thus, the materials of plastic portions 78 on two or more shoes 77 or of plastic portions 178 on two or more shoes 177 can be different or can be treated differently so that each plastic portion or at least some of the plastic portions will ensure a stagewise or stepwise intensification of the braking action between the mass 21 and the housing portion 73. Another mode of ensuring such stepwise intensification of the braking action is to bias two or more shoes 77 or two or more shoes 177 with a different radially oriented force. Each shoe 77 or 177 can carry a plastic portion 78 or 178 at each of its sides, i.e., at different radial distances from the axis X—X.

The sealing element 47 and/or 49 and/or 50 can be replaced with a seal other than a diaphragm spring, for example, by a labyrinth seal, without departing from the spirit of the invention.

Furthermore, the illustrated antifriction bearing 6 can be replaced with a friction (sliding) bearing or with one or more other types of bearings.

An important advantage of the improved torque transmitting apparatus is that the damper 9 is located radially inwardly of the friction surfaces 3a and 55a of clutch 4. This renders it possible to reduce the radial dimensions of the apparatus without unduly reducing or without appreciably reducing the areas of the friction surfaces. Thus, the improved torque transmitting apparatus can embody a friction clutch which can transmit large torques even though its pressure plate 55 and housing 60 are driven by flywheels which are constructed and assembled with one or more dampers in such a way that the dampers are disposed radially inwardly of the friction surfaces.

As will be fully described hereinafter, the bearing between the flywheels can be installed in the chamber for the energy storing elements of the damper so that a single supply of lubricant suffices to adequately lubricate the energy storing elements of the damper as well as the rolling elements of the bearing.

Regardless of the exact nature of the bearing and irrespective of the exact location where the bearing is installed between the flywheels, it is desirable to locate the bearing radially inwardly of the energy storing elements of the damper.

The abutments or arms 36a, 36b of the wall 38 and/or the abutments or arms 37a, 37b of the wall 46 can be obtained by providing the outer sides of these walls with suitably configurated depressions, e.g., in a manner as fully described and shown in commonly owned U.S. Pat. No. 5,042,632 granted Aug. 27, 1991 to Jäckel. The disclosure of this patent is also incorporated herein by reference.

The form-locking connection (including the sheet metal member 52) between the secondary flywheel 3 and the walls 38, 46 of the enclosure defining the chamber 11 can be replaced with a force-locking connection or with a connection which relies on frictional engagement between the walls 38, 46 and the flywheel 3.

The feature that the bolts 8 can serve as a means for attaching the flywheel 2 to the output element of the prime mover as well as for non-rotatably connecting the input members 15, 31 of the damper 9 to the flywheel 2 contributes to the simplicity and lower cost of the improved apparatus. However, it is also possible to provide discrete fasteners which serve the sole purpose of securing the input members 15, 31 to each other and/or to the main section 13 of the flywheel 2. In either event, it is presently preferred to connect the input members 15, 31 to the flywheel 2 at a location radially inwardly of the energy storing elements 10 of the damper 9.

The illustrated input members 15 and 31 have radially inner portions which abut each other in the regions of the heads of the bolts 8, radially outer portions which abut each other in the region of the sealing element 47, and intermediate portions which are spaced apart from each other in the direction of the axis X—X. Such design contributes to the stability of the composite input member including the members 15 and 31.

The sealing element 49 and/or 50 constitutes a frictional seal. An advantage of such design is that the chamber 11 can be sealed from the surrounding atmosphere in a simple and inexpensive but reliable way.

FIG. 1 shows that the friction surface 3a of the flywheel 3 and the chamber for energy storing elements 10 of the damper are disposed in or at least close to a common plane which is normal to the axis X—X. This too, contributes to compactness of the torque transmitting apparatus. Additional savings in space (as seen in the direction of the axis X—X) are achieved by positioning the bearing 6 and the heads of the bolts 8 in a common plane which is normal to the axis X—X. Moreover, and as shown in FIG. 1, it is presently preferred to assemble the torque transmitting apparatus in such a way that the chamber 11 and the energy storing elements 10 therein are disposed between the friction surface 3a of the flywheel 3 and the heads of the bolts 8. This, too, entails savings in space as seen in the direction of the axis X—X. Additional savings in space are achieved by placing the axially extending portion 31a of the input member 31 radially between the energy storing elements 10 and the heads of the bolts 8, i.e., in or at the radially inner portion of the chamber 11.

The torque transmitting apparatus of FIGS. 1 and 2 is assembled in such a way that the external profile of the input element which receives torque from the hub 5a of the clutch disc 5 is disposed at a first radial distance from the axis X—X, that the bearing 6 is disposed at a greater second radial distance from such axis, that the heads of the bolts 8 are disposed at a greater third radial distance from the axis X—X, that the radially inner portion of the enclosure defining the chamber is disposed at a greater fourth radial distance from the axis X—X, that the energy storing elements 10 are located at a greater fifth radial distance from the axis, that a radially outer portion of the enclosure is located at a greater sixth radial distance from the axis X—X, and that the friction surface 3a of the second flywheel 3 is located at a greater seventh radial distance from the axis X—X. Substantial savings in space in the direction as well as radially of the axis X—X can be achieved by ensuring that at least four of the aforementioned seven radial distances are adhered to in such a way that they differ from one another.

Otherwise stated, the diameter of the external profile of the input element in the hub 5a of the clutch disc 5 should not overlap the diameter of the bearing 6, the diameter of the circle formed by the heads of the bolts 8, the diameter of the radially inner portion of the enclosure for the chamber 11, the diameter of the annulus formed by the energy storing elements 10, the diameter of the radially outer portion of the enclosure, and the minimum diameter (or at least an intermediate diameter) of the friction surface 3a on the flywheel 3. At least four of the seven components having the above-enumerated diameters are preferably located in or at least close to a plane which is normal to the axis X—X. This too contributes to compactness of the torque transmitting apparatus. For example, the heads of the bolts 8, the bearing 6, the energy storing elements 10 and the friction surface 3a can be located in or at least very close to a plane which is normal to the axis X—X.

The dimensions of the springs 10a and/or 10b of the damper 9 can be selected in such a way that the length of each such spring is between four and ten times the diameters of its convolutions. Furthermore the length of the springs 10a and/or 10b in the circumferential direction of the flywheels 2 and 3 can be such that the sum of the springs (by placing them end-to-end) has a length of 252°–342°, i.e., between approximately 70–95% (preferably between 80–90%) of a complete circle. For example, each of the illustrated springs 10 can extend along an arc of more than 140°.

It is further desirable to impart to the springs 10 an arcuate shape prior to insertion into the compartment 12 of the chamber 11, i.e., to bend the springs 10 in such a way that their curvature need not be appreciably increased or reduced during insertion into the enclosure that includes the walls 38 and 46,or during removal from such enclosure.

The portion 73 of the clutch housing is or can be permanently or separably affixed to the flywheel 3. For example, the portion 73 and the flywheel 3 can be welded or otherwise bonded to each other. Alternatively, the portion 73 and the flywheel 3 can be connected to each other by pins, threaded fasteners or rivets. Still further, it is possible to provide a readily separable connection, for example, in a manner as disclosed in the German patent application P 42 32 320 corresponding to U.S. Pat. application Ser. No. 08/125,002, filed Sep. 21, 1993. This is often desirable and advantageous because the housing can be detached in order to permit replacement of a damaged clutch disc.

The feature that the radially outer portion of the clutch disc 5 has a shape at least substantially conforming to that of the adjacent wall 38 of the enclosure also contributes to the compactness of the improved apparatus.

The provision of means for deflecting the lubricant which escapes from the chamber 11 in the event of damage to or other failure of the sealing element 47, 49 and/or 50 reduces the likelihood of damage to the friction clutch 4. Such deflecting means can be installed on or can form part of the flywheel 2, flywheel 3, wall 38, wall 46, input member 15 and/or input member 31 in the regions of the sealing elements 47, 49, 50 and/or at the openings or passages in the parts which are likely to be contacted by lubricant escaping from the chamber 11.

The outline of a portion of or the entire clutch spring 57 can be selected in such a way that it at least approximates or even closely conforms to the outline of the adjacent portion of the clutch disc 5 when the parts 5 and 57 are close to each other in the engaged condition of the clutch. The provision of openings between the prongs 57a of the spring 57 (e.g., by enlarging some of the slots 57b in the regions of the openings 56 of the clutch disc 5) enables a tool to reach the heads of the bolts 8 in the fully assembled condition of the torque transmitting apparatus. Openings in the clutch spring 57 for the purpose of permitting the introduction of a tool into to and beyond the openings 56 of the clutch disc 5 can also be formed by omitting or removing selected portions of the prongs 57a.

The friction generating device 76 constitutes an optional but desirable and advantageous feature of the improved torque transmitting apparatus. The portion or portions 78 or 178 of its shoe(s) 77 or 177 can be made of any one of a number of suitable plastic materials, such as polytetrafluoroethylene, polyamide 6.6, PEEK or others.

FIG. 1 merely shows two passages 68 in the bottom wall 74 and only two passages 69 in the axially extending portion 73 of the clutch housing 60. The number of such passages can be increased to further enhance the cooling of certain constituents of the improved apparatus. In addition, it is equally possible to provide such passages only in the portion 73 or only in the bottom wall 74 of the housing 60. One of the presently preferred modes of adequately cooling the torque transmitting apparatus is to establish one or more paths for the flow of air through the clutch disc 5, along the wall 38, through the second flywheel 3, outwardly of the wall 46 and against the flywheel 2. Alternatively, or in addition to such path or paths, it is advisable to provide one or more paths for the flow of air through the flywheel 2, along the wall 46 and against the flywheel 3. Still further, one can establish one or more paths for the flow of air through the primary flywheel 2 (at 71) and directly against the secondary flywheel 3.

The aforediscussed enlargement of certain surfaces on the flywheel 3 (opposite the friction surface 3a), on the pressure plate 55 (opposite the friction surface 55a) and/or on one or more additional components of the torque transmitting apparatus can be achieved in the aforediscussed manner, i.e., by grooving, raising, undulating, roughening or otherwise treating the respective surfaces in order to enhance the dissipation of heat. For example, one can employ a circular milling tool or an analogous tool to enlarge such surfaces. Furthermore, this enlargement of certain surfaces can be carried out in such a way that certain portions of the surfaces resemble those of vanes or blades in a fan or the like so that rotation of the respective parts (such as 3 and 55) even further enhances the flow of cool air along the aforementioned paths for the purpose of preventing overheating of the lubricant in the chamber 11, of the friction linings (if any) of the clutch disc 5, of the flywheel 3, of the pressure plate 55, of the flywheel 2, of the energy storing elements 10 and/or others.

The friction clutch 4 of FIGS. 1 and 2 is a so-called push-type clutch, i.e., the radially innermost portions of the prongs 57a forming part of the clutch spring 57 must be depressed or pulled toward the flywheels 2, 3 in order to disengage the clutch. However, the invention can be embodied with equal or similar advantage in so-called pull-type friction clutches wherein the radially innermost portions of the prongs 57a must be pulled or pushed in a direction away from the pressure plate in order to disengage the clutch.

Figure 6:
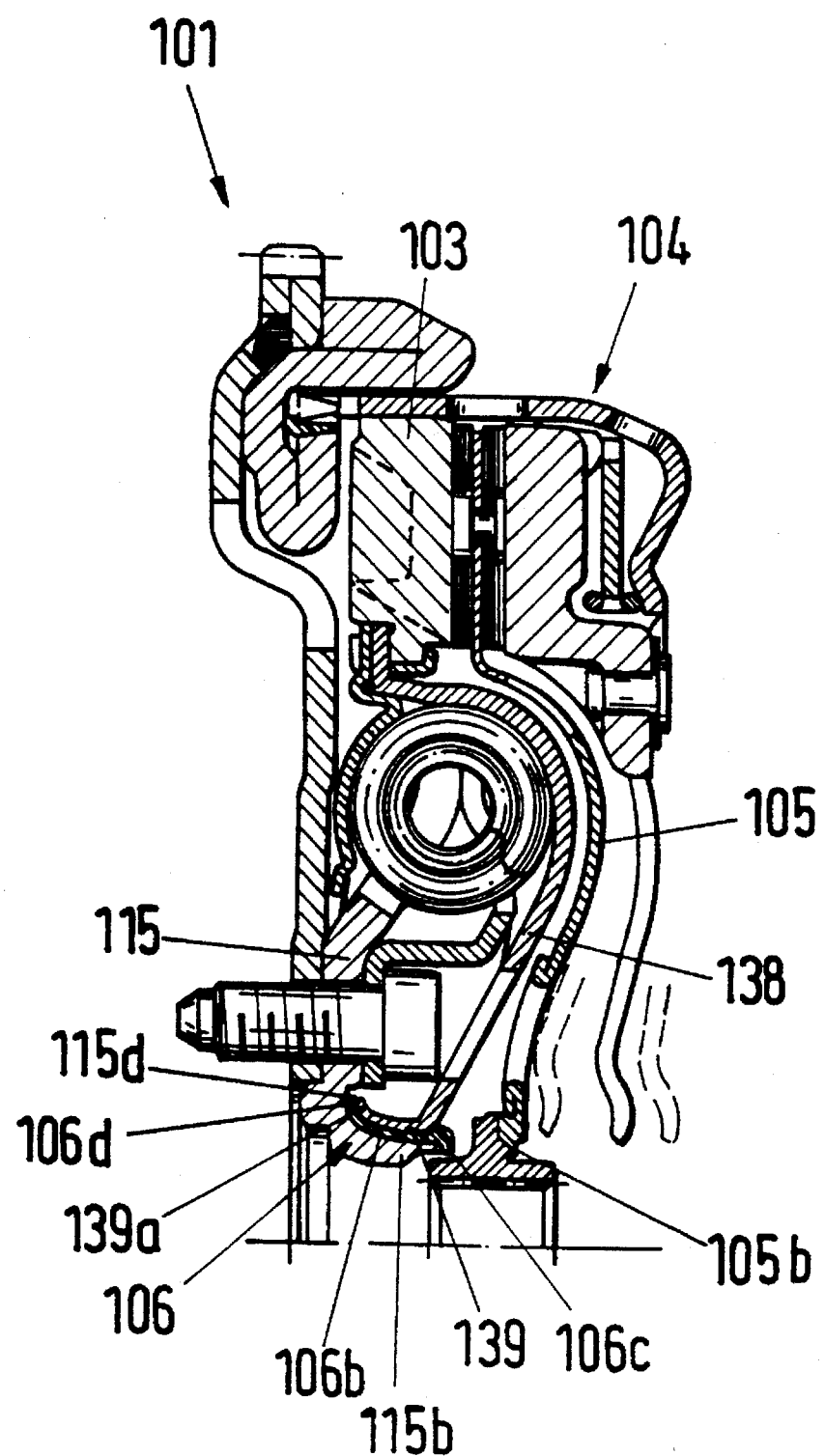
FIG. 6 is a fragmentary axial sectional view of a second torque transmitting apparatus according to the invention.

FIG. 6 illustrates a portion of a modified torque transmitting apparatus. All such parts of the apparatus of FIG. 6 which are identical with or clearly analogous to the corresponding parts of the apparatus shown in FIGS. 1 and 2 are denoted by similar reference characters plus 100.

The composite or split flywheel assembly 101 of the apparatus which is shown in FIG. 6 is rather similar to the composite flywheel 1 except that that the bearing 106 between the flywheels 102 and 103 is a friction bearing or sliding bearing, i.e., it does not employ any balls, needles or other rolling elements. The radially inner portion 115b of the input member 115 has an external shoulder which is coated with a film or layer 106b of friction reducing material which forms a cylindrical or substantially cylindrical sleeve surrounding the portion 115b and being, in turn, surrounded by the portion 139 of the wall 138. The sleeve 106b has a radially inwardly extending collar 106c which overlies the adjacent end face of the portion 115b. Another collar 106d at the left-hand axial end of the sleeve 106b extends radially outwardly in abutment with the adjacent end face of a portion 115d of the input member 115. The portion or shoulder 139 of the wall 138 has an internal surface which surrounds the layer or sleeve 106b, and the end 139a of the shoulder 139 conforms to the adjacent collar 106d of the sleeve 106b. The just-described mounting of the sleeve 106b between the shoulder 139 and the portion 115b ensures that the wall 138 (and hence the secondary flywheel 103 which is affixed thereto and the friction clutch 104 which is carried by the flywheel 103) is held against any undesired movement in the radial direction of the common axis of the flywheels 102, 103 as well as at least in one direction of such axis.

The illustrated friction bearing 106 can be replaced with a composite friction bearing having a first friction reducing part which is designed to prevent radial movements of the flywheels 102, 103 relative to each other, and a discrete second friction reducing part which serves to prevent axial movements of the flywheel in a direction toward and/or in a direction away from the flywheel 102.

The hub 5a of the clutch disc 5 of FIGS. 1 and 2 is riveted to the radially outer portion of such clutch disc. On the other hand, the hub of the clutch disc 105 in the apparatus of FIG. 6 is friction welded (as at 105b) to the radially outer portion of the clutch disc 105. Thus, it is not necessary to employ separate parts (rivets or the like) to properly connect the hub and the radially outer portion of the clutch disc 105 to each other, it is also possible to avoid the utilization of separately machined rivets or other fasteners by establishing a form-locking connection between the hub and the radially outer portion of the clutch disc 5. For example, some material of the hub can be displaced into complementary recesses or sockets of the radially outer portion of the clutch disc 105 and/or vice versa.

Figure 6A:
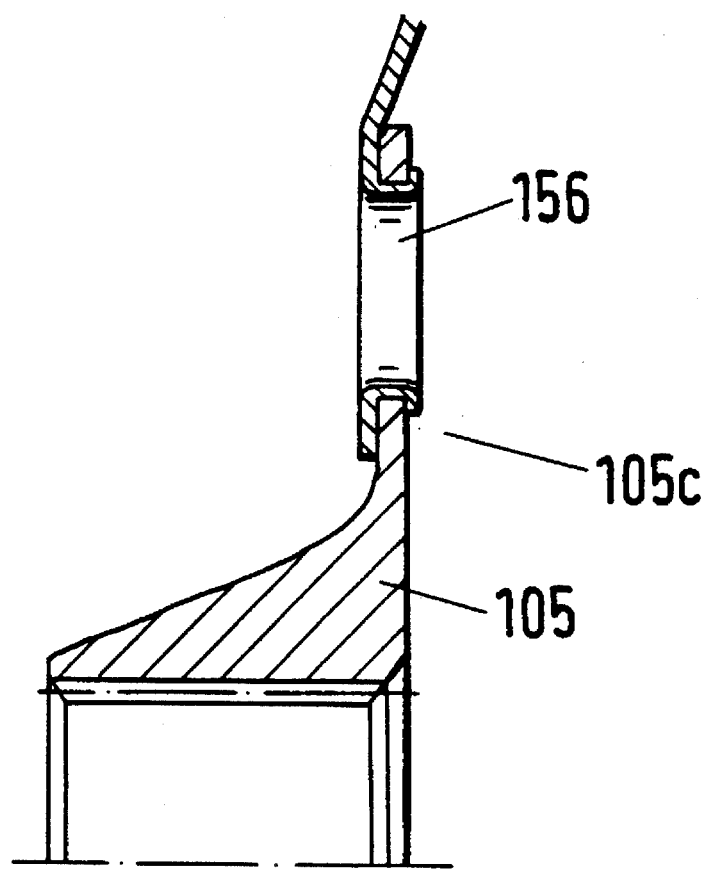
FIG. 6a is a fragmentary sectional view of a modified clutch disc which can be utilized in the apparatus of FIGS. 1–2 or in the apparatus of FIG. 6.

FIG. 6a shows another presently-preferred connection 105c between the hub and the radially outer portion of a clutch disc 105. The radially outer portion is provided with openings 156 (only one shown) each of which is surrounded by a sleeve extending through an opening of the hub and being expanded at its free end so as to overlie the right-hand side of the respective portion of the hub. In other words, the radially outer portion of the clutch disc 105 is riveted to the hub without the need for separately produced rivets. All that is necessary is to deform certain parts of the radially outer portion of the clutch disc 105 to form the sleeves, the sleeves are caused to pass through the respective openings 156, and the fee ends of the sleeves are thereupon bent radially outwardly to constitute rivet heads. The openings 156 can further serve to permit the working end of a tool to reach the heads of bolts (not shown in FIG. 6a) and/or to permit the flow of cool air when the apparatus including the clutch disc 105 is in use. Another advantage of the clutch disc 105 of FIG. 6a is that the sleeves in the openings 156 reinforce the radially outer portion so that it can be made of a relatively thin sheet material.

Figure 7:
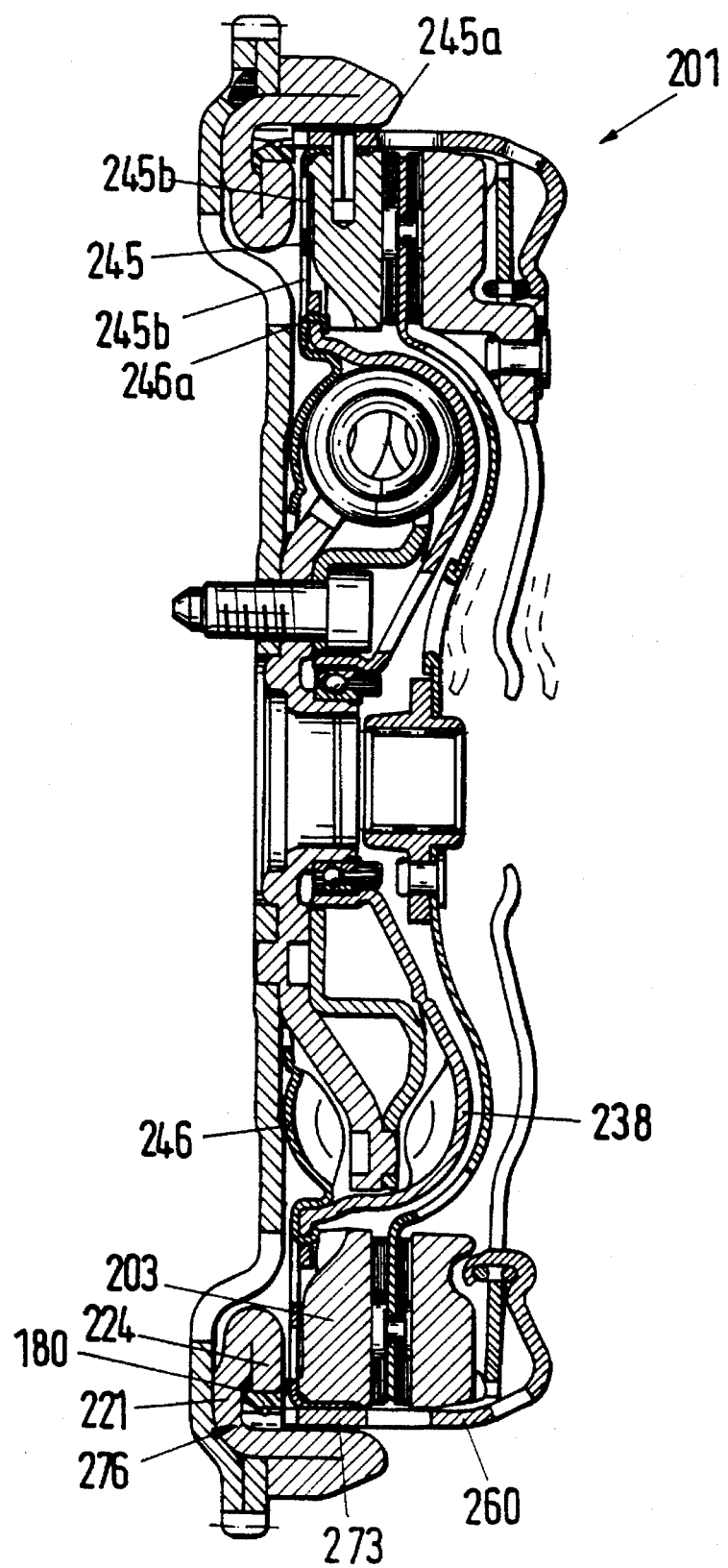
FIG. 7 is an axial sectional view of a third torque transmitting apparatus according to the invention.

FIG. 7 illustrates a further torque transmitting apparatus wherein all such parts which are identical with or clearly analogous to the corresponding parts of the apparatus of FIGS. 1 and 2 are denoted by similar reference characters plus 200. The secondary flywheel 203 of the composite flywheel 201 is connected to the wall 246 by way of its radially outwardly extending portion 245 which overlies the entire left-hand side of the flywheel 203 opposite the friction surface. The radially outermost part 245a of the portion 245 is bent in the direction of the common axis of the flywheels 202, 203 to overlie at least a substantial portion of the peripheral surface of the flywheel 203. The part 245a can be said to constitute a relatively short cylinder extending from the major part of the portion 245 in a direction away from the flywheel 202, i.e., away from the prime mover whose output element is to rotate the flywheel 202. The cylindrical part 245a is surrounded by the axially extending portion 273 of the housing 260 of the friction clutch. The part 245a and the housing portion 273 are non-rotatably connected to the secondary flywheel 203 by a set of radially extending fasteners in the form of pins, bolts, screws or the like.

The radially extending portion 245 of the wall 246 is further provided with tongues 246a which at first extend in parallelism with the common axis of the flywheels 202, 203 to pass through slots or holes in the radially extending portion 244 of the wall 238. The tongues 246a are thereupon bent radially inwardly to engage the right-hand side of the wall 238 and to thus reliably secure the walls 238, 246 to each other. Though it is possible to attach separately produced tongues 246a to the radially extending portions 245, it is preferred to make these tongues of one piece with the wall 246. This renders it possible to dispense with the connecting member 52 which is utilized in the torque transmitting apparatus of FIGS. 1 and 2.

Another advantage of the apparatus of FIG. 7 is that the extent of heat transfer between the flywheel 203 and the enclosure including the walls 238, 246 is reduced so that the lubricant in the chamber for the energy storing elements of the damper is less likely to be overheated.

Figure 8:
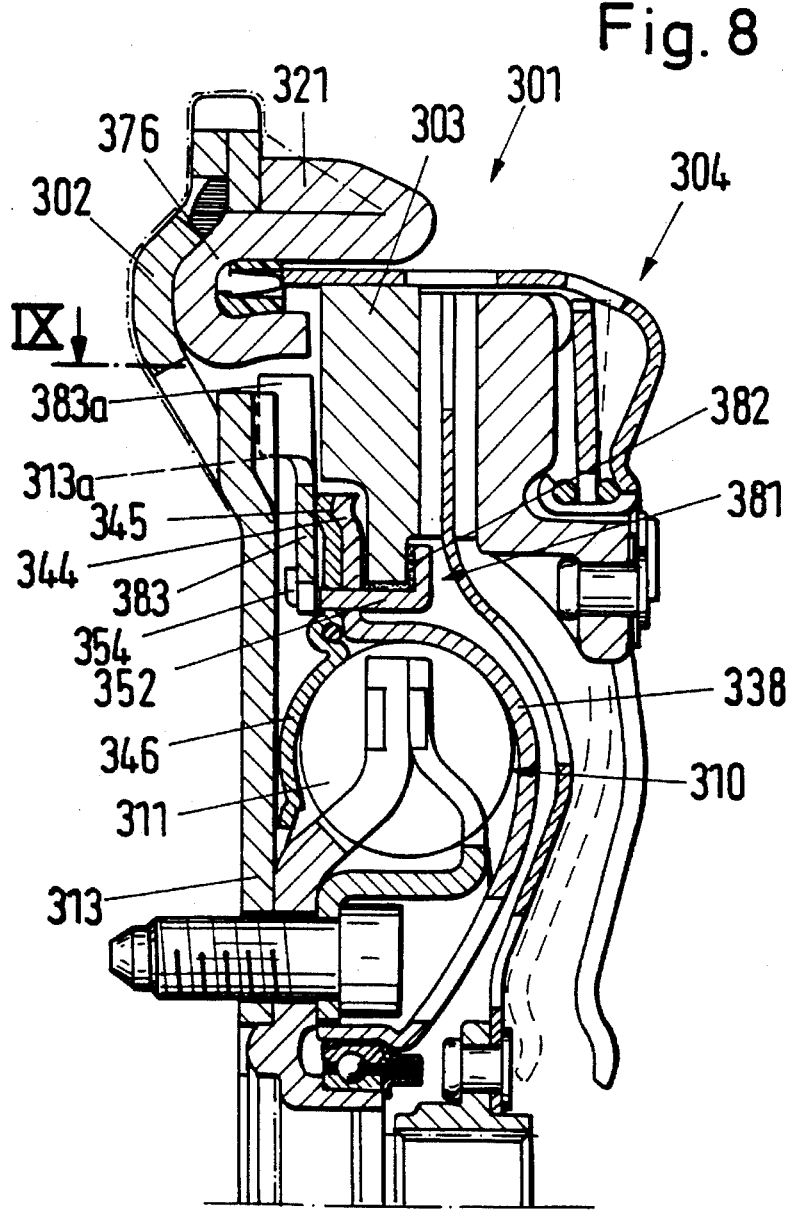
FIG. 8 is a fragmentary axial sectional view of a fourth torque transmitting apparatus according to the invention.
Figure 9:
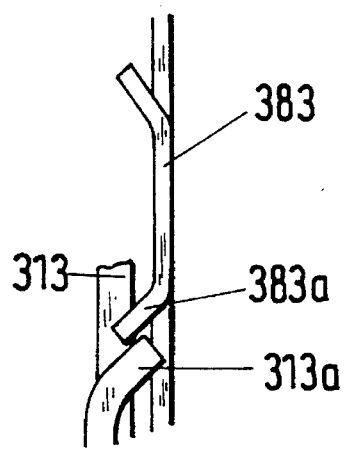
FIG. 9 is a fragmentary end elevational view of a combination of primary flywheel and a diaphragm spring as seen in the direction of arrow IX in FIG. 8.

The friction generating device 276 in the apparatus of FIG. 7 employs shoes 177 of the type shown in FIG. 4. The profiled portions 180 of the shoes 177 overlie the left-hand side of the adjacent portion 224 of the mass 221. An advantage of such construction is that the radially outer face of the portion 224 of the mass 221 can remain parallel to the common axis of the flywheels 202 and 203. In other words, it is not necessary to machine and/or to otherwise form the conical recesses shown at 80 in FIG. 1, i.e., the mass 221 can be made with substantial savings in FIGS. 8 and 9 show the details of a further apparatus. All such parts of this apparatus which are identical with or clearly analogous to the corresponding parts of the apparatus of FIGS. 1 and 2 are denoted by similar reference characters plus 300.

The mass 321 of the primary flywheel 302 of the composite flywheel 301 of FIG. 8 has a substantially S-shaped cross-sectional outline. This mass confines a friction generating device 376 whose construction and mode of operation are analogous to those of the friction generating device 76. The apparatus of FIGS. 8 and 9 further comprises means for limiting the magnitude of torque which can be transmitted from the primary flywheel 302 to the friction clutch 304, and such torque limiting means comprises a slip clutch 381. The slip clutch 381 is interposed between the walls 338, 346 (i.e., between the output member of the damper including the energy storing element 31 0) and the secondary flywheel 303 so that it prevents the transmission of excessive torque from the damper to the flywheel 303 and hence to the housing and pressure plate of the clutch 304.

The walls 338, 346 of the enclosure which defines the chamber 311 for the energy storing elements 31 0 are connected to each other by a member 352 in a manner similar to that described for the walls 38, 46 and the member 52 of the apparatus shown in FIGS. 1 and 2. A heat-insulating friction generating lining 382 is installed between the secondary flywheel 303 and the member 352. The illustrated friction lining 382 has a substantially U-shaped cross-sectional outline with one radially outwardly extending leg between the right-hand side of the flywheel 303 and the radially outwardly extending right-hand portion of the member 352, and with another radially outwardly extending leg of the lining disposed between the left-hand side of the flywheel 303 and the wall 338. The material of the lining 382 is preferably selected in such a way that the lining at least impedes the transfer of heat from the flywheel 303 to the interior of the chamber 311.

A diaphragm spring 383 is installed between the radially extending portion 345 of the wall 346 and the deformed tongues 354 of the connecting member 352 and serves to bias the secondary flywheel 303, the connecting member 352 and the portions 344, 345 of the walls 338, 346 against each other in the direction of the common axis of the flywheels 302 and 303. This causes the friction lining 382 of the slip clutch 381 to permit rotation of the flywheels 302, 303 relative to each other as soon as the magnitude of the torque being transmitted from the flywheel 302 to the energy storing elements 310 of the damper exceeds a preselected value.

The magnitude of maximum torque which can be transmitted by the slip clutch 381 is preferably regulatable in such a way that it decreases in response to maximum angular displacement of the flywheels 302 and 303 relative to each other. Thus, the flywheels 302, 303 should be capable of continuing to turn relative to each other when the slip clutch 381 is at least partially disengaged. This greatly reduces or practically eliminates the danger of transmission of excessive torque which could result in damage to or in complete destruction of certain driven parts, e.g., of a variable-speed transmission which receives torque from the clutch disc of the friction clutch 304 in the apparatus of FIGS. 8 and 9.

As can be seen in FIG. 9, the diaphragm spring 383 of the slip clutch 381 is provided with wing-shaped protuberances 383a which extend toward the prime mover and can cooperate with suitably inclined or sloping ramps 313a on the main section or portion 313 of the primary flywheel 302.

When the flywheels 302, 303 are caused to turn relative to each other, the protuberances 383a approach the ramps 313a and/or vice versa and ultimately reach the corresponding ramps. This causes the diaphragm spring 383 to move axially toward the main section 313 of the primary flywheel 302 so that the slip clutch 381 is actuated in a sense to reduce the maximum torque that can be transmitted to the secondary flywheel 303. In other words, the slip clutch 381 is activated in a sense to permit the transmission of a smaller or relatively small torque, i.e., the flywheel 303 and the clutch 304 which is carried by and rotates with the flywheel 303 is no longer rotated by the walls 338, 346 when the magnitude of torque transmitted by the springs 310 to the walls 338, 346 is less (or even much less) than the maximum value, such as is being transmitted when the wings or projections 383a are spaced apart from the ramps 313a on the main section 313 of the primary flywheel 302.

The slip clutch 381 can be designed in such a way that it becomes effective only when the flywheels 302, 303 rotate relative to each other in a single direction or that it becomes effective irrespective of the direction of rotation of the flywheels 302, 303 relative to one another. Still further, the slip clutch 381 can be designed in such a way that it can transmit a relatively small torque when the two flywheels tend to rotate relative to each other in a first direction but that it can transmit a different (e.g., larger) torque in response to a tendency of the two flywheels to rotate relative to each other in a second direction counter to the first direction.

The illustrated slip clutch 381 is designed in such a way (known as end angle regulation) that it is installed at the secondary side and between the secondary flywheel 303 and the energy storing elements 310, as seen in a direction radially of the common axis of the flywheels 302 and 303. The slip clutch 381 is disposed radially between the secondary flywheel 303 and the energy storing elements 310 in the chamber 311, and the bearing between the two flywheels is disposed in a common plane with the heads of the bolts which are used to affix the primary flywheel 302 to the output element of a prime mover. The bearing and the heads of the bolts are in line or substantially in line (i.e., in or close to a common plane) with the slip clutch 381.

Figure 10:
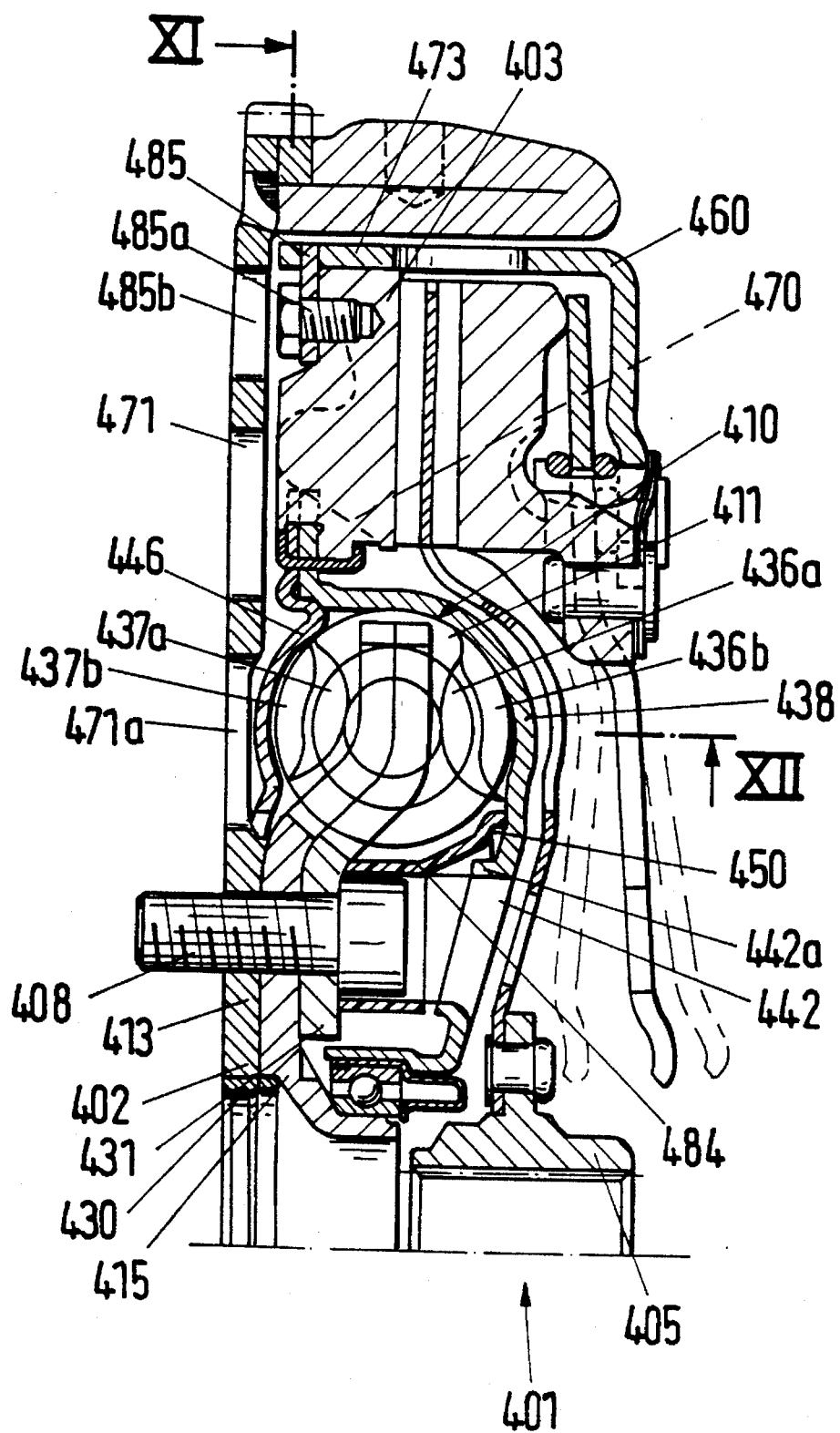
FIG. 10 is a fragmentary axial sectional view of a fifth torque transmitting apparatus according to the invention.

FIG. 10 shows a portion of a different torque transmitting apparatus. All such parts of this apparatus which are identical with or clearly analogous to corresponding parts of the apparatus shown in FIGS. 1 and 2 are denoted by similar reference characters plus 400. The composite flywheel 401 comprises a primary flywheel 402 and a coaxial secondary flywheel 403. The input members 415 and 431 of the damper including the energy storing elements 410 in the chamber 411 are configured and dimensioned in such a way that the entire member 431 abuts the member 415. In other words, not only the radially outermost and the radially inner portions of the input members 415 and 431 abut each other but the entire intermediate portion of the member 431 also abuts the adjacent part of the member 415. The latter carries a centering member 430 which can center the primary flywheel 302, and hence the entire torque transmitting apparatus of FIG. 10, on the output element of the prime mover.

The two discrete input members 415, 431 can be replaced with a one-piece input member, and such one-piece input member can constitute a casting, a forging or a part made of sintered material.

The radially inner portion of the chamber 411 is bounded by a discrete wall 484, i.e., the enclosure defining the chamber 411 includes three walls 438, 446 and 484. The wall 484 is or can be made of a plastic material and its radially inner portion is configured in such a way that it surrounds the heads of the bolts 408. This reduces the likelihood of misorientation of the bolts 408 during storage and/or during transport to the locale of use as well as during introduction of the shanks of bolts 408 into the tapped bores or holes of the output element of the prime mover or of a part which is driven by such output element.

The radially outer (right-hand) portion of the wall 484 partially surrounds a sealing element in the form of a diaphragm spring 450 which cooperates with the wall 438 to seal the respective portion of the chamber 411.

The wall 438 is provided with openings 442 which permit the introduction of the bolts 408 until the heads of the bolts reach the input member 431; at such time, the heads of the bolts are fully received in the surrounding portions of the wall 484. The openings 442 are surrounded by collars 442a forming part of the wall 438 and extending toward the heads of the properly inserted bolts 408. Such openings not only serve to permit the introduction of bolts 408 but also enable the working end of a tool to reach and rotate the heads of the bolts for the purpose of affixing the primary flywheel 402 to, or of detaching the flywheel 402 from, the output element of a prime mover. The collars 442a surround and maintain in proper orientation the heads of the bolts 408 during transport or at any time when the shanks of the bolts do not extend, or do not appreciably extend, beyond the left-hand side of the main section 413 of the primary flywheel 402. Still further, the collars 442a can together constitute a means for centering a sealing element, e.g., a sealing element which replaces the sealing element 450. In addition to being centered at the inner side of the wall 438, the sealing element 450 can also be centered by the ring which is formed by the radially outermost portions of the collars 442a.

Figure 11:
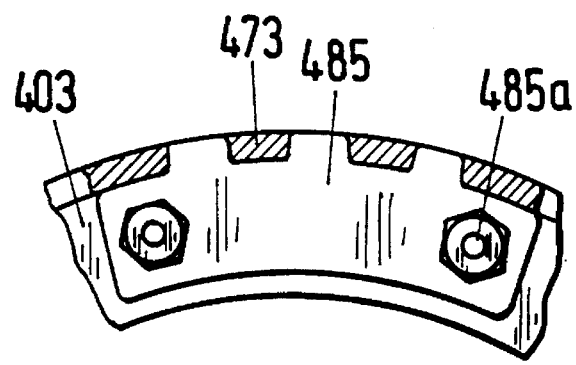
FIG. 11 is a fragmentary sectional view substantially as seen in the direction of arrow XI in FIG. 10.

The axially extending portion 473 of the clutch housing 460 is connected with the secondary flywheel 403 by a set of plate-like members 485 which are spaced apart from each other in the circumferential direction of the flywheels. As can be seen in FIG. 11, each plate-like connecting member 485 is provided with at least one radial projection extending through suitable slots or cutouts or openings of the housing portion 473. Threaded fasteners 485a are utilized to secure the connecting members 485 to the secondary flywheel 403, and more specifically to that side of the flywheel 403 which faces away from the friction surface. The heads of the fasteners 485a can be reached through ventilating passages or channels 485b which are provided in the substantially plate-like or disc-shaped main section 413 of the primary flywheel 402. The number of passages 485b can exceed the number of fasteners 485a. FIG. 10 shows additional passages or channels 471 and 471a which are provided in the main section 413 of the primary flywheel to establish paths for the flow of a coolant (air) against the enclosure defining the chamber 411 as well as directly against that side of the secondary flywheel 403 which faces away from the friction surfaces. The radially inner passages 471a are positioned to direct the coolant directly against the wall 446, i.e., against the enclosure, and the radially outer passages 471 direct streams of coolant directly against the secondary flywheel 403. Such a mode of cooling has been found to reliably prevent overheating of the secondary flywheel 403 as well as of the lubricant in the chamber 411.

That portion of the right-hand side or inner side of the main section 413 of the primary flywheel 402 which is adjacent the chamber 411 is preferably configured in such a way that it closely conforms to and is closely adjacent the outer side of the wall 446.

Figure 12:
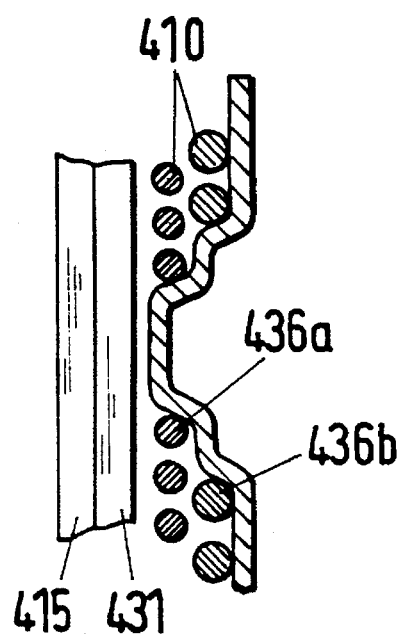
FIG. 12 is an enlarged fragmentary sectional view substantially as seen in the direction of arrow XII in FIG. 10.

FIG. 12 shows, by way of example, one presently preferred form of abutments 436a 436b for the adjacent end convolutions of coil springs 410b, 410a forming part of the energy storing elements 410 in the chamber 411. The abutments 437a, 437b of the wall 446 are or can be mirror images of the abutments 436a, 436b. Each abutment 436b constitutes a portion of the wall 438 which is depressed from the outer side of the wall into the chamber 411 so that it can engage the adjacent end convolutions of two outer coil springs 410a. Each abutment 436a constitutes a suitably depressed part of the respective depressed portion 436b so that it can be engaged by the end convolutions of two adjacent inner coil springs 410b. An advantage of such abutments or stops for the springs 410a, 410b is that it is not necessary to utilize separately produced parts to serve as arms which receive torque from the energy storing elements 410 for transmission to the secondary flywheel 403. The abutments 436a, 436b can be formed simultaneously with the conversion of a sheet metal blank into the wall 438, i.e., they can be formed by repeatedly deforming selected portions of the blank to form the abutments 436b and immediately thereafter the abutments 436a.

If the torque transmitting apparatus of FIG. 10 is installed in the power train between the combustion engine or electric motor and the wheels of a motor vehicle, it can be provided with one or more friction generating devices, e.g., one for operation while the prime mover is idling and another to be used when the prime mover drives the vehicle.

The outline of the radially outer portion of the clutch disc 405 at least substantially conforms to the outline of the adjacent portion of the wall 438, and such radially outer portion of the clutch disc 405 is provided with a number of passages, some at the radial level of the chamber 411 and some radially inwardly of the chamber. This enables streams of a coolant to flow along the wall 438 toward and through the passages 470 of the secondary flywheel 403 toward and through the main section 413 of the primary flywheel 402.

In at least some of the illustrated embodiments of the invention, diaphragm springs which serve as a means for sealing the chamber for the energy storing elements of the damper can further constitute component parts of one or more slip clutches or analogous means for limiting the magnitude of transmitted torque. This enhances the versatility of the apparatus without increasing the cost because the sealing elements for the chamber can perform the additional function of constituting component parts of one or more slip clutches or analogous torque limiting means.

Figure 13:
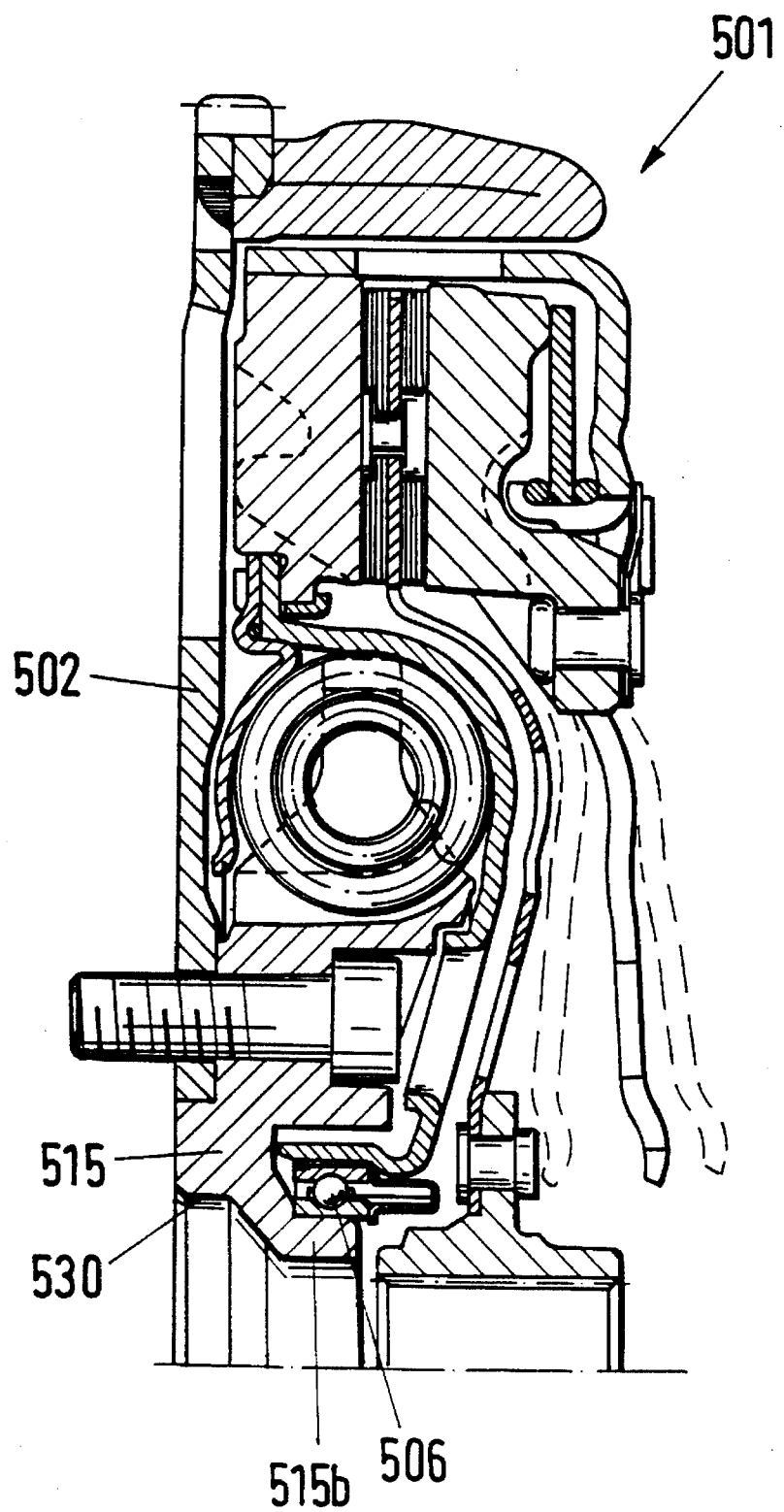
FIG. 13 is a fragmentary axial sectional view of a sixth torque transmitting apparatus according to the invention.

Referring to FIG. 13, there is shown a further torque transmitting apparatus including a composite flywheel 501 composed of a primary flywheel 502 and a secondary flywheel. All such parts of this apparatus which are identical with or clearly analogous to the corresponding parts of the apparatus of FIGS. 1 and 2 are denoted by similar reference characters plus 500. The input member 515 replaces the input members 415, 431 and the wall 484. This one-piece input member can constitute a casting, a forging or a sintered part without any, or without any appreciable, secondary treatment. This entails considerable savings in connection with the making of the apparatus because the primary flywheel 502 can be mounted on or assembled with the input member 515 in a simple and time saving manner. A sintered input member 515 exhibits several additional advantages, especially as concerns the cost of making and assembling the torque transmitting apparatus. Thus, it is possible to dispense with the making of a discrete wall 484 from a plastic material, and the axially extending radially inner portion 515b can be surrounded by the inner race of the antifriction bearing 506 without any secondary treatment. The same holds true for the centering member 530 which centers the primary flywheel 502 relative the secondary flywheel and relative to the enclosure for the chamber which receives the energy storing elements of the damper.

Figure 14:
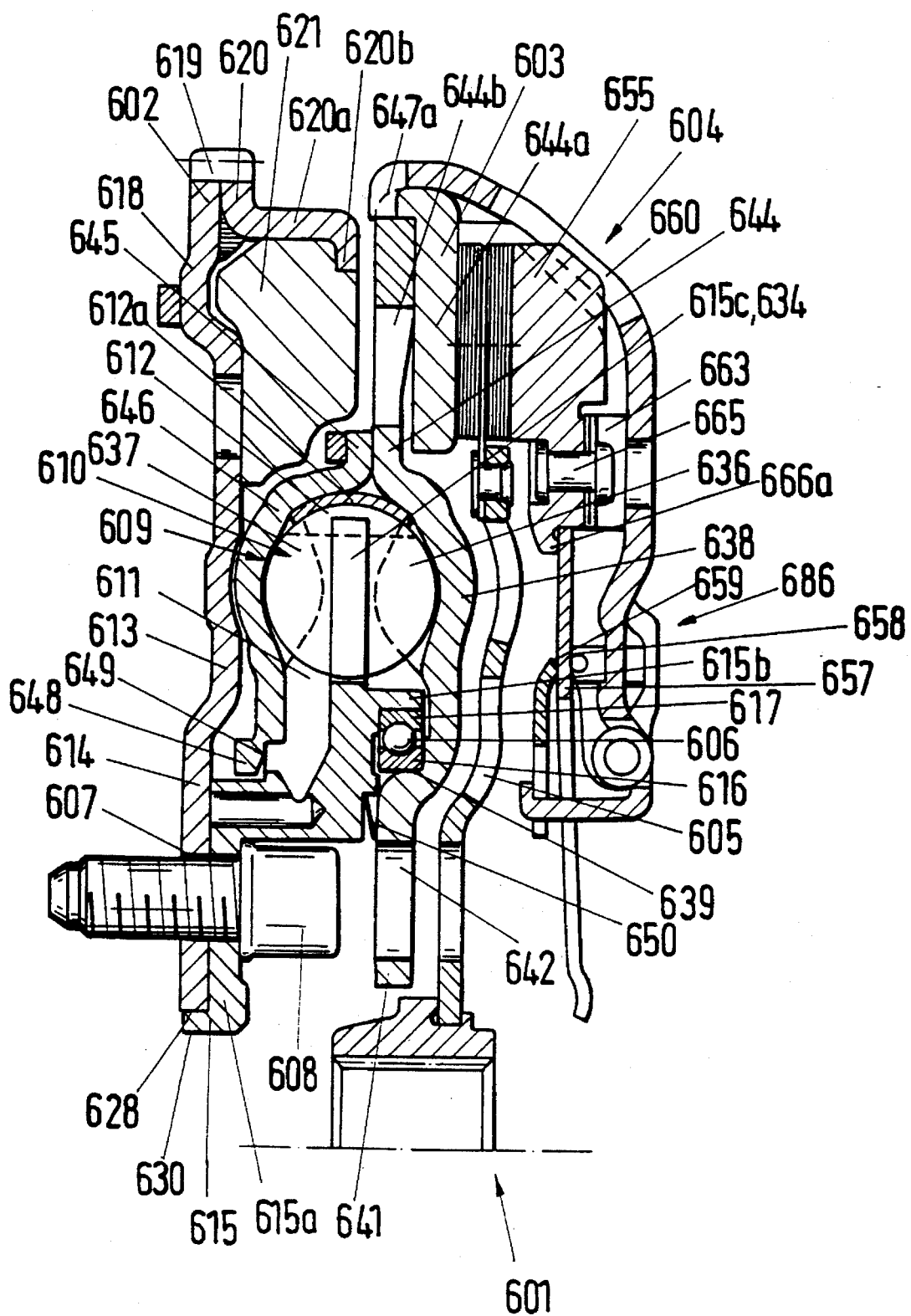
FIG. 14 is a fragmentary axial sectional view of a further torque transmitting apparatus according to the invention.

FIG. 14 shows another torque transmitting apparatus which embodies numerous features of the invention. All such parts of this apparatus which are identical with or clearly analogous to the corresponding parts of the apparatus of FIGS. 1 and 2 are denoted by similar reference characters plus 600.

The composite flywheel 601 comprises a primary flywheel 602 and a secondary flywheel 603 which is coaxial with the primary flywheel 602 and which can rotate together with, as well as relative to, the primary flywheel. The secondary flywheel 603 carries a friction clutch 604 having a clutch disc 605 which is interposed between the friction surface of the flywheel 603 and the friction surface of a pressure plate 655 forming part of the clutch 604. The main section 613 of the primary flywheel is connectable to the rotary output element of a prime mover, e.g., an engine or motor in a motor vehicle, and the hub of the clutch disc 605 can transmit torque to the rotary input element of a variable-speed transmission in the vehicle. FIG. 14 shows a simple clutch disc 605 because the exact construction of this part of the friction clutch forms no part of the present invention. In actual use of the torque transmitting apparatus, the friction clutch 604 can embody a clutch disc of the type described and shown, for example, in the aforementioned U.S. Pat. No. 5,161,660 to Huber. As a rule, the carrier which extends radially outwardly from the hub of the clutch disc 605 will support two sets of friction linings one of which can be engaged by the friction surface of the secondary flywheel 603 (this flywheel constitutes the counterpressure plate of the friction clutch) and the other of which can be engaged by the friction surface of the axially movable pressure plate 655 when the clutch 604 is set to transmit torque from the flywheel 603 to the input element of the transmission.

An antifriction bearing 606 is installed between the flywheels 602, 603 by way of parts which are rigid with the two flywheels. In contrast to the construction which is shown in FIGS. 1 and 2, the apparatus of FIG. 14 is constructed and assembled in such a way that the bearing 606 is located radially outwardly of the holes or bores 607 for the shanks of the bolts 608. The damper 609 includes energy storing elements 610 in a chamber 611 which is defined by an enclosure including walls 638 and 646. As already described with reference to FIGS. 1 and 2, and as best shown in FIG. 3, each energy storing element 610 can comprise at least one coil spring. Such coil springs are confined in the ring-shaped radially outermost part or compartment 612 of the chamber 611. Again, the chamber 611 is at least partially filled with a flowable solid lubricant (such as graphite powder) or with a viscous lubricant, preferably a lubricant of pasty consistency.

The main section 613 of the primary flywheel 602 is a converted blank of metallic sheet material. The conversion can be made in a suitable stamping, drawing or other machine in a manner not forming part of the present invention. The holes 607 are provided in the main section 613, and more particularly in a radially inner portion 614 of the section 613. The portion 614 is a flat washer-like part of the main section 613 and carries an input member 615 forming part of the damper 609. The radially outwardly extending portion or portions 615a of the input member 615 are provided with openings which register with the holes 607 and permit the insertion of the shanks of bolts 608 so that the shanks can be driven into the tapped bores of an output element, such as a crankshaft or a camshaft. The outer race 617 of the bearing 606 (which is shown in the form of a simple ball bearing with a single annulus of rolling elements) is surrounded by an axially extending portion 615b of one piece with the radially extending portion(s) 615a of the input member 615. The portion 615b can directly surround the outer race 617 or a heat barrier corresponding to the part 6a in the apparatus of FIGS. 1 and 2. The inner race 616 of the bearing 606 surrounds the adjacent portion of the secondary flywheel 603.

The radially outer part of the main section 613 includes a dished portion 618 which extends from the plane of the portion 614 toward the prime mover (not shown) assumed to be located to the left of the primary flywheel 602. The portion 618 is of one piece with a starter gear 619 which is or which can be similar to the starter gear 19 in the apparatus of FIGS. 1 and 2. The method of making the starter gear 619 is analogous to or identical with the aforedescribed method of making the starter gear 19. The radially inwardly extending portion or layer 620 of the starter gear 619 is welded or otherwise bonded or affixed to the main section 613 at the inner side of the portion 618, and the portion 620 is of one piece with a further portion 620a extending in parallel with the axis X—X in a direction away from the prime mover, i.e., in a direction toward the radially outermost portion of the housing or casing 660 forming part of the friction clutch 604. The rightmost part of the axially extending portion 620a is of one piece with a radially inwardly extending portion 620b which is recessed into the adjacent radially outer portion of the mass 621 forming part of the primary flywheel 602.

The mass 621 constitutes an optional but desirable element which enhances the moment of inertia of the primary flywheel 602. The illustrated mass 621 is a casting and at least a substantial part of its left-hand side abuts the adjacent part of the main section 613 of the primary flywheel 602. The peripheral surface of the mass 621 abuts the internal surface of the portion 620a between the radially inwardly extending portion 620b and the welded joint between the layer 620 of the starter gear 619 and the portion 618 of the main section 613. The driving connection between the main section 613 and the mass 621 is established by the portion 620b which can include an annularly arranged set of prongs of one piece with the cylindrical portion 620a and being bent radially inwardly into complementary recesses of the mass 621 when the insertion of the mass into the portion 620a is completed. It is also possible to avoid the making of prongs and to simply bend the entire right-hand marginal part of the portion 620a radially inwardly to thus reliably secure the mass 621 to the main section 613 of the primary flywheel 602.

The input member 615 is centered relative to the primary flywheel 602, for example, by a seat 628 which extends into the centrally located opening of the main section 613 and abuts the radially innermost part of the portion 614 forming part of the main section 613. The internal surface 630 of the input member 615 serves to center the flywheel assembly 601 and the friction clutch 604 on the output element of the prime mover.

The outer part of the radially extending portion 615a of the input member 615 merges into an axially extending portion which extends along and beyond the heads of the bolts 608 and merges into a radially outwardly extending portion 615c. This radially outwardly extending portion constitutes a holder of or support for a set of radially outwardly extending arms or abutments 634 disposed between the end convolutions of the neighboring springs 610 in the compartment 612 of the chamber 611. The springs 610 act in the circumferential direction of the composite flywheel 601, the same as the springs 10 of the damper 9 in the apparatus of FIGS. 1 and 2. Furthermore, the arms 634 can be designed in the same way as described in connection with the arms 34, 35 which are shown in FIGS. 1 and 3, i.e., the edge faces of the arms 634 can conform to the outlines of the adjacent end convolutions to avoid any misorientation of the end convolutions relative to the adjacent intermediate or additional convolutions of the springs 610.

The end convolutions of the springs 610 further bear against abutments 636 and 637 which can be made, configurated and inserted in the same way as described for abutments 36a, 36b and 37a, 37b in the apparatus of FIGS. 1 and 2. The arms 636 are of one piece with wall 638, and the arms 637 are of one piece with wall 646. The radially inner portion of the wall 638 is surrounded by the inner race 616 of the antifriction bearing 606, and the radially outer portion of the wall 638 carries the secondary flywheel 603. The inner race 616 of the bearing 606 directly surrounds a shoulder 639 which is provided on the radially inner portion of the wall 638 and extends toward the portion 614 of the main section 613 of the primary flywheel 602. The radially innermost portion 641 of the wall 638 is located in a plane which is at least substantially normal to the axis X—X, and such radially innermost portion 641 extends from the inner race 616 of the bearing toward but short of the hub of the clutch disc 605. The portion 641 of the wall 638 is provided with openings 642 which establish paths for the introduction of the bolts 608 as well as for the working end of a tool which is to engage the heads of the bolts. The diameters of the openings 642 are preferably dimensioned in such a way that the openings 642 can receive the heads of the bolts 608 and can properly orient such bolts when the shanks do not extend, or do not appreciably extend, beyond the left-hand side of the main section 613. Such situation can develop during storage, transport and initial stage of mounting of the torque transmitting apparatus.

An intermediate portion of the wall 638 is closely adjacent the energy storing elements or springs 610 in the chamber 611 and the configuration of such intermediate portion is such that the curvature of its left-hand side matches the curvature of the adjacent portions of convolutions of the springs 610. The radially outermost portion 644 of the wall 638 extends at least substantially radially outwardly and is connected to a radially outer portion 645 of a second wall 646. The wall 646 is installed between the main section 613 of the primary flywheel 602 and the wall 638 radially inwardly of the mass 621, and its radially outermost portion is welded, otherwise bonded or separably secured to the radially outermost portion 644 of the wall 638.

A wear-resistant arcuate trough-shaped insert 612a is installed in the radially outermost portion of the compartment 612 to prevent direct contact of the radially outermost portions of convolutions forming part of the springs 610 with the walls 638, 646 when the springs 610 orbit and tend to move radially outwardly under the action of centrifugal force. The concave inner side of the insert 612a can closely follow the outlines of the adjacent portions of the springs 610.

The radially outer portion 644 of the wall 638 extends radially outwardly beyond the radially outermost portion 645 of the wall 646 and is folded over itself to form a radially inwardly extending leg 644a. The outer part of the leg 644a directly abuts the adjacent part of the portion 644 but the inner part of the leg 644a is spaced apart from the adjacent part of the portion 644. The radially innermost portion of the leg 644a is located slightly radially outwardly of the compartment 612 of the chamber 611. The clearance between the radially inner portion of the leg 644a and the adjacent part of the portion 644 establishes a path for the circulation of air which can flow through passages 644b in the left-hand part of the portion 644 and thereupon radially outwardly between the mass 621 of the primary flywheel 602 and the secondary flywheel 603.

The radially inner portion 648 of the wall 646 extends in parallelism with the axis X—X toward the prime mover and serves as a retainer for a sealing element in the form of a diaphragm spring 649. The latter reacts against the wall portion 648 and bears against the adjacent portion of the input member 615 to seal the neighboring portion of the chamber 611 from the atmosphere. The installation of the diaphragm spring 649 can be changed, i.e., the spring can react against the input member 615 to bear against the portion 648 of the wall 646. This diaphragm spring can be centered by the wall 646 and/or by the input member 615.

Another sealing element in the form of a diaphragm spring 650 is installed between the input member 615 and the wall 638 to seal the chamber 611 in a region adjacent and located radially inwardly of the bearing 606. The radially outer portion of the diaphragm spring 650 is centered by and reacts against the input member 615, and the radially inner portion of this spring bears against the wall 638.

An advantage of the torque transmitting apparatus which is shown in FIG. 14 is that the bearing 606 is located in the chamber 611 so that one and the same supply of solid or viscous lubricant can be used to lubricate the springs 610 as well as the rolling elements of the bearing 606, at least when the flywheel 602 is driven by a prime mover.

The composite flywheel 601 is preferably assembled with the clutch 604 (including the clutch disc 605) in the manufacturing plant to constitute a module which can be readily manipulated in storage, during shipment and during attachment to the output element of a prime mover. Centering of the clutch disc 605 between the friction surface of the secondary flywheel 603 and the pressure plate 655 is preferably completed in the manufacturing plant.

The inner side of the bottom wall of the clutch housing 660 carries two seats 658, 659 disposed at opposite sides of the circumferentially complete radially outer or main portion of the clutch spring 657. The latter is a diaphragm spring and its main portion carries a set of radially inwardly extending prongs. The seats 658, 659 form part of a wear compensating unit 686 which is or which can be constructed, assembled and operated in a manner as disclosed, for example, in the commonly owned published German patent application No. 42 39 291 and in the corresponding patents and patent applications in countries other than Federal Republic Germany. The purpose of the unit 686 is to automatically compensate for wear upon the friction linings of the clutch disc 605 and preferably also for wear upon the clutch spring 657, pressure plate 655 and flywheel 603.

The pressure plate 655 of the friction clutch 604 is non-rotatably but axially movably connected to the housing 660 by a set of leaf springs 663 each of which has a first end portion riveted or otherwise affixed to the housing 660 and another end portion secured to the pressure plate 655 by rivets 665. The rivets 665 are located radially inwardly of the friction surfaces of the flywheel 603 and the pressure plate 655 and radially outwardly of the location 666a where the radially outermost portion of the clutch spring 657 bears upon the right-hand side of the pressure plate 655.

The housing 660 of the friction clutch 604, the clutch disc 605, the primary flywheel 602 and, if necessary, certain other parts of the torque transmitting apparatus are provided with channels or passages to ensure adequate cooling of the secondary flywheel 603 and the enclosure including the walls 638 and 646. The distribution of such passages is or can be analogous to that previously described with reference to FIGS. 1 to 13.

The radially outer portion of the secondary flywheel 603 is non-rotatably connected with the adjacent radially outer portion of the housing 660. Alternatively, or in addition to such connection, the housing can be connected with the radially outer portion 644 of the wall 638 because this wall shares the angular movements of the flywheel 603. The illustrated connection includes tongues 647a which are parallel to the axis X—X during assembly of the module including the composite flywheel 601 and the friction clutch 604 and are thereupon bent radially inwardly upon completed insertion of the secondary flywheel 603 into the housing 660. Each tongue 647a extends into a complementary recess or socket in the left-hand side of the flywheel 603. This ensures that the housing 660 and the flywheel 603 are held against axial and/or angular movements relative to each other.

The improved torque transmitting apparatus, its flywheel assembly and its friction clutch are susceptible of numerous additional modifications without departing from the spirit of the invention. For example, some or all of the features shown in FIGS. 1 and 2 can be incorporated in the apparatus of FIG. 6, 7, 9, 10, 13 and/or 14 or vice versa. Furthermore, numerous features can be incorporated into certain other apparatus including those which are described in the references listed in this specification. Applicants reserve the right to seek protection for all such features and combinations of features in addition to those recited in the appended claims.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. Apparatus for transmitting torque comprising: first and second flywheels rotatable with as well as relative to each other about a common axis, said first flywheel being arranged to be rotated by a prime mover and said second flywheel being arranged to transmit torque to a transmission and comprising an annular component provided with a friction surface; and means for opposing rotation of said flywheels relative to each other including a slip clutch and a damper having energy storing elements in series with said slip clutch, interposed between said flywheels and acting in a direction circumferentially of said flywheels, said energy storing elements, one of said flywheels and said slip clutch being at least closely adjacent to a plane which is normal to said axis, said energy storing elements and said slip clutch and said annular component being disposed at different radial distances from said axis and being located at least substantially at the same distance from said plane.

2. The apparatus of claim 1, wherein said energy storing elements have first portions disposed at a greater distance and second portions disposed at a lesser distance from said axis, at least said first portions of said energy storing elements being confined in an at least substantially sealed chamber.

3. The apparatus of claim 2, wherein said chamber is bounded by a surface including a portion conforming to and adjacent said first portions of said energy storing elements.

4. The apparatus of claim 1, further comprising an enclosure defining an at least substantially sealed chamber receiving at least a portion of each of said energy storing elements, said enclosure having at least two walls and at least one of said walls being connected with said second flywheel.

5. The apparatus of claim 4, wherein said at least one wall supports said second flywheel.

6. The apparatus of claim 1, further comprising a friction bearing interposed between said flywheels.

7. The apparatus of claim 1, further comprising an antifriction bearing interposed between said flywheels.

8. The apparatus of claim 1, wherein at least one of said energy storing elements includes at least one coil spring.

9. The apparatus of claim 1, wherein at least one of said energy storing elements includes at least one torsion spring.

10. The apparatus of claim 1, further comprising an enclosure defining an at least substantially sealed chamber receiving at least a portion of each of said energy storing elements, said enclosure having a radially outer portion disposed at a greater distance and a radially inner portion disposed at a lesser distance from said axis, said radially inner portion being a least substantially sealed and further comprising a supply of dry lubricant at least partially filling said chamber.

11. The apparatus of claim 1, further comprising means for sealing from the atmosphere an at least substantially sealed chamber receiving at least a portion of each of said energy storing elements, said sealing means including at least one labyrinth seal.

12. The apparatus of claim 1, further comprising a supply of viscous fluid at least partially filling an at least substantially sealed chamber receiving at least a portion of each of said energy storing elements.

13. The apparatus of claim 12, wherein said viscous fluid is a paste.

14. The apparatus of claim 1, further comprising a bearing interposed between said flywheels, at least a portion of said bearing being disposed in an at least substantially sealed chamber receiving at least a portion of each of said energy storing elements.

15. The apparatus of claim 1, further comprising a bearing interposed between said flywheels radially inwardly of said energy storing elements.

16. The apparatus of claim 1, further comprising an enclosure defining an at least substantially sealed chamber receiving at least a portion of each of said energy storing elements, said enclosure comprising a first wall and a second wall connected to said first wall radially outwardly of said energy storing elements.

17. The apparatus of claim 16, further comprising at least one sealing element between said walls radially outwardly of said energy storing elements.

18. The apparatus of claim 17, wherein said at least one sealing element includes an O-ring.

19. The apparatus of claim 1, further comprising an enclosure defining an at least substantially sealed chamber receiving at least a portion of each of said energy storing elements, said enclosure including at least one wall having abutments for said energy storing elements.

20. The apparatus of claim 19, wherein said abutments include pairs of confronting depressions provided in said at least one wall and extending substantially in the direction of said axis, into said chamber, and between said energy storing elements.

21. The apparatus of claim 1, further comprising an enclosure defining an at least substantially sealed chamber receiving at least a portion of each of said energy storing elements, said enclosure including at least one wall connected with said second flywheel.

22. The apparatus of claim 21, wherein said second flywheel has a side facing away from said at least one friction surface and said wall is disposed at said side of said second flywheel.

23. The apparatus of claim 1, further comprising an enclosure defining an at least substantially sealed chamber receiving at least a portion of each of said energy storing elements, said enclosure including at least one wall and a form-locking connection between said at least one wall and said second flywheel.

24. The apparatus of claim 1, further comprising an enclosure defining an at least substantially sealed chamber receiving at least a portion of each of said energy storing elements, said enclosure including at least one wall in frictional engagement with said second flywheel.

25. The apparatus of claim 1, further comprising an enclosure receiving torque from said first flywheel by way of said energy storing elements and defining an at least substantially sealed chamber receiving at least a portion of each of said energy storing elements, said slip clutch being interposed between said enclosure and said second flywheel to transmit torque from said energy storing elements to a friction clutch between said second flywheel and a rotary input element of the transmission by way of said second flywheel.

26. The apparatus of claim 25, wherein said slip clutch contains a heat insulating material.

27. The apparatus of claim 1, further comprising an enclosure defining an at least substantially sealed chamber receiving at least a portion of each of said energy storing elements, said enclosure including at least one wall mounted on a bearing which is interposed between said flywheels.

28. The apparatus of claim 1, wherein said damper further comprises at least one flange having at least one portion extending into an at least substantially sealed chamber receiving at least a portion of each of said energy storing elements, said at least one portion of said at least one flange being arranged to transmit torque to said energy storing elements in response to rotation of said first flywheel, said at least one flange being connected with said first flywheel radially inwardly of said energy storing elements.

29. The apparatus of claim 28, further comprising means for fastening said first flywheel to the output element of the prime mover and for simultaneously fastening said at least one flange to said first flywheel.

30. The apparatus of claim 1, wherein said damper further comprises a plurality of flanges having radially outer portions connected to each other, at least one of said flanges comprising at least one arm extending into an at least substantially sealed chamber receiving at least a portion of each of said energy storing elements, said at least one arm being arranged to transmit torque to said energy storing elements in response to rotation of said first flywheel and at least one of said flanges being connected with said first flywheel radially inwardly of said energy storing elements.

31. The apparatus of claim 1, further comprising means for fastening said first flywheel to an output element of the prime mover, said damper further comprising a plurality of flanges connected to said first flywheel and at least one of said flanges having a portion extending into an at least substantially sealed chamber receiving at least a portion of each of said energy storing elements, said portion of said at least one flange being arranged to transmit torque to said energy storing elements in response to rotation of said first flywheel and said flanges having portions which are disposed in the region of said fastening means and are closely adjacent each other.

32. The apparatus of claim 1, further comprising means for fastening said first flywheel to an output element of the prime mover radially inwardly of said energy storing elements, said damper further comprising a plurality of flanges connected to said first flywheel by said fastening means and at least one of said flanges having a portion extending into an at least substantially sealed chamber receiving at least a portion of each of said energy storing elements, said portion of said at least one flange being arranged to transmit torque to said energy storing elements in response to rotation of said first flywheel, said flanges having portions which are spaced apart from each other in the direction of said axis and are disposed at least in part intermediate said fastening means and said energy storing elements.

33. The apparatus of claim 1, wherein said damper further comprises at least one flange driven by said first flywheel and comprising portions extending into an at least substantially sealed chamber receiving at least a portion of each of said energy storing elements, said portions of said at least one flange being arranged to transmit torque to said energy storing elements in response to rotation of said first flywheel and said energy storing elements including coil springs having end convolutions and additional convolutions between the respective end convolutions, said portions of said at least one flange engaging said end convolutions and being configured to transmit thereto torque in response to rotation of said first flywheel without appreciably changing the orientation of said end convolutions relative to the respective additional convolutions.

34. The apparatus of claim 1, wherein said energy storing elements comprise first coil springs and second coil springs at least partially within the respective first coil springs, said damper further comprising at least one input member receiving torque from said first flywheel and including substantially sealed chamber receiving at least a portion first and second portions extending into an at least of each of said energy storing elements, said first and second portions of said at least one input member being arranged to respectively transmit torque to said first and second coil springs in response to rotation of said first flywheel.

35. The apparatus of claim 1, wherein said energy storing elements include first springs and second springs at least partially surrounded by the respective first springs, and further comprising an enclosure defining an at least substantially sealed chamber receiving at least a portion of each of said energy storing elements, said enclosure including at least one wall connected to said second flywheel and including first and second abutments extending into said chamber and respectively receiving torque from said first and second springs in response to rotation of said first flywheel.

36. The apparatus of claim 35, wherein said first abutments include deformed portions of said at least one wall and said second abutments include deformed parts of said deformed portions.

37. The apparatus of claim 1, wherein said damper further comprises at least one input member including portions extending into an at least substantially sealed chamber receiving at least a portion of each of said energy storing elements, said portions of said at least one input member being arranged to transmit torque to said energy storing elements in response to rotation of said first flywheel, and further comprising means for centering said at least one input member on said first flywheel.

38. The apparatus of claim 1, wherein said damper further comprises at least one input member arranged to transmit torque to said energy storing elements in response to rotation of said first flywheel, and further comprising means for centering said at least one input member on an output element of the prime mover.

39. The apparatus of claim 1, wherein said damper further comprises at least one input member arranged to transmit torque to said energy storing elements in response to rotation of said first flywheel, and further comprising a bearing interposed between said flywheels and surrounded by said at least one input member.

40. The apparatus of claim 1, wherein said damper further comprises a plurality of input members arranged to transmit torque to said energy storing elements in response to rotation of said first flywheel, one of said input members including means for connecting said first flywheel to an output element of the prime mover, means for centering said first flywheel on the output element of the prime mover, means for supporting a bearing interposed between said flywheels, and means for centering said second flywheel.

41. The apparatus of claim 1, wherein said damper further comprises at least one output member arranged to transmit torque from said energy storing elements to said second flywheel in response to rotation of said first flywheel, and further comprising an enclosure defining an at least substantially sealed chamber receiving at least a portion of each of said energy storing elements, said enclosure including at least one wall and means for sealing said chamber including at least one sealing element disposed radially inwardly of said energy storing elements between said at least one wall and an output member of said damper.

42. The apparatus of claim 41, wherein said at least one sealing element includes a diaphragm spring.

43. The apparatus of claim 41, wherein said enclosure further comprises a second wall connected with said at least one wall and with one of said flywheels, and further comprising means for fastening said first flywheel to an output element of the prime mover, one of said walls including means for maintaining said fastening means in a predetermined position relative to said first flywheel.

44. The apparatus of claim 1, further comprising an enclosure defining an at least substantially sealed chamber receiving at least a portion of each of said energy storing elements, said enclosure including at least one wall having at least one opening, and further comprising means for securing said first flywheel to an output element of the prime mover including at least one fastener extendable through said at least one opening.

45. The apparatus of claim 1, further comprising rotary threaded fasteners for securing said first flywheel to an output element of the prime mover, and an enclosure defining an at least substantially sealed chamber receiving at least a portion of each of said energy storing elements, said enclosure including at least one wall having openings positioned to permit passage of a tool having means for rotating said fasteners.

46. The apparatus of claim 45, wherein said at least one wall has collars surrounding said openings.

47. The apparatus of claim 46, wherein said enclosure further comprises at least one sealing element for said chamber, said at least one sealing element being disposed in the region of said openings.

48. The apparatus of claim 1, further comprising an enclosure defining an at least substantially sealed chamber receiving at least a portion of each of said energy storing elements, and means for sealing said chamber including at least one diaphragm spring forming part of said slip clutch.

49. The apparatus of claim 1, wherein said energy storing elements are disposed in a common plane extending at right angles to said axis and said friction surface is at least close to said common plane.

50. The apparatus of claim 1, further comprising means for fastening said first flywheel to an output element of the prime mover including fasteners having heads disposed in a predetermined plane extending at least substantially at right angles to said axis, and a bearing interposed between said flywheels and disposed at least close to said predetermined plane.

51. The apparatus of claim 1, further comprising means for fastening said first flywheel to an output element of the prime mover, said fastening means including threaded fasteners having heads disposed at least close to a common plane extending substantially at right angles to said axis, said friction surface being provided at said common plane and said common energy storing elements being disposed radially between said heads and said friction surface.

52. The apparatus of claim 1, wherein said damper further comprises at least one input member arranged to transmit torque to said energy storing elements in response to rotation of said first flywheel, and further comprising means for fastening said first flywheel to an output element of the prime mover including a plurality of fasteners, said at least one input member having a portion disposed between said fasteners and an at least substantially sealed chamber receiving at least a portion of each of said energy storing elements.

53. The apparatus of claim 1, further comprising a friction clutch connectable between said second flywheel and an input element of the transmission, and a bearing between said flywheels, said input element of the transmission having a profile disposed at a first radial distance from said axis upon connection of said friction clutch to said input element and said bearing being disposed at a second radial distance from said axis, and further comprising means for fastening said first flywheel to an output element of the prime mover including fasteners disposed at a third radial distance from said axis, and an enclosure defining an at least substantially sealed chamber receiving at least a portion of each of said energy storing elements, said enclosure including a radially inner portion disposed at a fourth radial distance from said axis, said energy storing elements being disposed at a fifth radial distance from said axis and said enclosure further including a radially outer portion disposed at a sixth radial distance from said axis, said friction surface being disposed at a seventh radial distance from said axis and at least four of said first to seventh distances being different from each other.

54. The apparatus of claim 53, wherein said profile has a first diameter and said bearing has a different second diameter, said fasteners having heads forming a circle with a third diameter different from said first and second diameters, said radially inner portion of said enclosure having a fourth diameter different from said first to third diameters, said energy storing elements forming an annulus having a fifth diameter different from said first to fourth diameters, said radially outer portion of said enclosure having a sixth diameter different from said first to fifth diameters and said friction surface having a seventh diameter different from said first to sixth diameters.

55. The apparatus of claim 53, wherein at least four of said profile, said bearing, said fasteners, said radially inner portion of said enclosure, said energy storing elements, said radially outer portion of said enclosure, and said friction surface are disposed at least close to said plane when said friction clutch is connected to the input element of the transmission.

56. The apparatus of claim 1, further comprising means for fastening said first flywheel to an output element of the prime mover, including fasteners disposed at a first radial distance from said axis, and further comprising a bearing disposed at a second radial distance from said axis less than said first radial distance.

57. The apparatus of claim 1, further comprising means for fastening said first flywheel to an output element of the prime mover, said fastening means being disposed at a first radial distance from said axis and a bearing which is interposed between said flywheels being disposed at a second radial distance from said axis less than said first radial distance, said energy storing elements being disposed at a third radial distance from said axis greater than said first radial distance.

58. The apparatus of claim 1, further comprising means for fastening said first flywheel to an output element of the prime mover, said fastening means including fasteners having portions disposed in a first plane extending at right angles to said axis and said energy storing elements being disposed in a second plane at least close to or coinciding with said first plane.

59. The apparatus of claim 1, further comprising an enclosure which defines an at least substantially sealed chamber receiving at least a portion of each of said energy storing elements, said enclosure including a portion disposed at a first radial distance from said axis, said energy storing elements being disposed at a second radial distance from said axis different from said first radial distance, and further comprising means for fastening said first flywheel to an output element of the prime mover at a third radial distance from said axis.

60. The apparatus of claim 59 wherein said first distance exceeds said third distance and is less than said second distance.

61. The apparatus of claim 1, further comprising a bearing interposed between said flywheels and disposed at a first radial distance from said axis, and means for fastening said first flywheel to an output element of the prime mover including fasteners disposed at a second radial distance from said axis less than said first radial distance.

62. The apparatus of claim 1, wherein said energy storing elements comprise coil springs each having a diameter and a length between approximately four and ten times said diameter.

63. The apparatus of claim 1, wherein said energy storing elements extend along arcs the sum of which is between approximately 252° and 342°.

64. The apparatus of claim 1, wherein at least one of said energy storing elements extends along an arc of at least 140°.

65. The apparatus of claim 1, wherein said energy storing elements include arcuate springs having a predetermined curvature which remains unchanged prior to insertion of said springs into and/or upon removal of said springs from a chamber.

66. The apparatus of claim 1, wherein said energy storing elements include at least one first energy storing element which opposes rotation of said flywheels relative to each other with a first force and at least one second energy storing element which opposes rotation of said flywheels relative to each other with a second force different from said first force.

67. The apparatus of claim 1, wherein said energy storing elements include at least one first energy storing element which opposes a first stage of rotation of said flywheels relative to each other and at least one second energy storing element which opposes a second stage of rotation of said flywheels relative to each other.

68. The apparatus of claim 1, wherein said energy storing elements include at least one coil spring having two end convolutions with a first pitch and at least one additional convolution disposed between said end convolutions and having a second pitch at least approximating said first pitch.

69. The apparatus of claim 1, further comprising an enclosure defining an at least substantially sealed chamber receiving at least a portion of each of said energy storing elements, said enclosure including a portion radially outwardly adjacent said energy storing elements, and further comprising a body of wear resistant material interposed between said energy storing elements and said portion of said enclosure and being engaged by said energy storing elements under the action of centrifugal force in response to rotation of said first flywheel and said enclosure.

70. The apparatus of claim 1, further comprising means for centering on said second flywheel a housing of a friction clutch which is disposed between said second flywheel and an input element of the transmission.

71. The apparatus of claim 1, further comprising a friction clutch disposed between said second flywheel and an input element of the transmission and comprising a housing including a portion extending in the direction of said axis and at least partially surrounding said second flywheel.

72. The apparatus of claim 71, wherein said axially extending portion of said housing centers the housing on said second flywheel.

73. The apparatus of claim 71, wherein said axially extending portion of said housing is bonded to said second flywheel.

74. The apparatus of claim 1, further comprising a friction clutch disposed between said second flywheel and an input element of the transmission and comprising a housing, and means for separably coupling said housing to said second flywheel.

75. The apparatus of claim 1, further comprising a friction clutch disposed between said second flywheel and an input element of the transmission and comprising a housing having means for separably coupling the housing to said second flywheel.

76. The apparatus of claim 1, further comprising a friction clutch disposed between said second flywheel and an input element of the transmission and comprising a clutch disc including a portion extending substantially radially of said axis, and an enclosure defining an at least substantially sealed chamber receiving at least a portion of each of said energy storing elements, said enclosure including at least one wall having a side adjacent said portion of said clutch disc, said portion of said clutch disc having a side confronting and at least substantially conforming to said side of said at least one wall.

77. The apparatus of claim 1, further comprising means for fastening said first flywheel to an output element of the prime mover and an enclosure defining an at least substantially sealed chamber receiving at least a portion of each of said energy storing elements, said enclosure having at least one wall provided with openings affording access to said fastening means, and further comprising a friction clutch disposed between said second flywheel and an input element of the transmission and comprising a clutch disc adjacent said at least one wall, at least one of said clutch disc and said at least one wall having means for deflecting a viscous fluid at least partially filling said chamber when such fluid tends to escape from said chamber in the region of said clutch disc and said at least one wall.

78. The apparatus of claim 1, further comprising means for fastening said first flywheel to an output element of the prime mover, and a friction clutch disposed between said second flywheel and an input element of the transmission and comprising a clutch disc having at least one opening affording access to said fastening means and permitting said fastening means to pass therethrough.

79. The apparatus of claim 1, further comprising means for fastening said first flywheel to an output element of the prime mover, and a friction clutch disposed between said second flywheel and an input element of the transmission and having at least one opening affording access to a tool for engagement with said fastening means.

80. The apparatus of claim 1, further comprising a friction clutch disposed between said second flywheel and an input element of the transmission and comprising a housing rotatable with said second flywheel, a pressure plate rotatable with and disposed between said housing and said second flywheel with freedom of movement in the direction of said axis, a clutch disc disposed between said pressure plate and said second flywheel and connectable to the input element of the transmission, and a clutch spring between said housing and said pressure plate, said clutch spring having a main portion bearing upon said pressure plate in an engaged condition of the friction clutch and prongs extending from said main portion, said clutch disc having a first outline and said main portion of said clutch spring being movable relative to said housing between a first position nearer to, and a second position more distant from, said clutch disc and having a second outline at least approximating said first outline in said first position of said main portion.

81. The apparatus of claim 80, further comprising means for fastening said first flywheel to an output element of the prime mover including a plurality of fasteners, said clutch disc having openings disposed in the region of said prongs and dimensioned to permit said fasteners to pass therethrough.

82. The apparatus of claim 80, further comprising fasteners arranged to attach said first flywheel to an output element of the prime mover, said clutch spring having openings permitting the introduction of a tool into engagement with said fasteners.

83. The apparatus of claim 1, further comprising a friction clutch disposed between said second flywheel and an input element of the transmission and comprising a housing rotatable with said second flywheel, a pressure plate disposed between and rotatable with said housing and said second flywheel and having projections confronting said housing, and a clutch spring having openings for said projections.

84. The apparatus of claim 85, wherein said clutch spring includes a set of prongs and slots between said prongs, said slots including narrower slots and wider slots constituting said openings.

85. The apparatus of claim 1, further comprising a friction clutch disposed between said second flywheel and an input element of the transmission and comprising a housing rotatable with said second flywheel, a pressure plate between said second flywheel and said housing, and leaf springs connecting said pressure plate to said housing with freedom of movement in the direction of said axis, said housing having a first side facing said second flywheel and a second side facing away from said second flywheel, at least a portion of each of said leaf springs being adjacent the second side of said housing.

86. The apparatus of claim 1, further comprising a friction clutch disposed between said second flywheel and an input element of the transmission and comprising a housing rotatable with said second flywheel, a pressure plate disposed between and rotatable with said housing and said second flywheel, a clutch spring between said housing and said pressure plate, and a seat assembly provided on said housing and tiltably mounting said clutch spring, said seat assembly having a first outline and said pressure plate having a first side facing said friction surface and a second side facing said housing, said second side including a portion having a second outline at least substantially complementary to and adjacent said first outline.

87. The apparatus of claim 86, wherein said clutch spring is tiltable at said seat assembly to engage and disengage the friction clutch, at least a portion of said seat assembly being overlapped by said pressure plate in the direction of said axis as well as radially of said axis in the disengaged condition of the friction clutch.

88. The apparatus of claim 1, further comprising a friction clutch disposed between said second flywheel and an input element of the transmission and comprising a housing, a clutch spring movable relative to said housing, at least one seat for said clutch spring, and means for securing said at least one seat to said housing, said means for securing being of one piece with said housing.

89. The apparatus of claim 88, wherein said friction clutch further comprises a pressure plate disposed between said clutch spring and said second flywheel and having a side facing said housing, said at least one seat having a first outline and at least a portion of said side of said pressure plate having a second outline at least substantially conforming to said first outline.

90. The apparatus of claim 1, further comprising an enclosure defining an at least substantially sealed chamber receiving at least a portion of each of said energy storing elements, said enclosure including a wall adjacent said first flywheel and having a first outline, said first flywheel including a portion adjacent said wall and having a second outline at least substantially conforming to said first outline.

91. The apparatus of claim 1, wherein at least a major portion of said first flywheel consists of metallic sheet material.

92. The apparatus of claim 1, further comprising a starter gear on said first flywheel.

93. The apparatus of claim 1, further comprising a starter gear on one of said flywheels, said starter gear comprising two overlapping layers of folded metallic sheet material.

94. The apparatus of claim 1, further comprising a starter gear of one piece with one of said flywheels.

95. The apparatus of claim 1, wherein said first flywheel comprises a main section and a mass carried by said main section.

96. The apparatus of claim 95, wherein said mass is a casting.

97. The apparatus of claim 95, wherein said mass comprises layers of folded metallic sheet material.

98. The apparatus of claim 95, further comprising a friction clutch disposed between said second flywheel and an input element of the transmission and comprising a housing including a portion extending in the direction of said axis, said mass including a portion at least partially surrounding said portion of said housing.

99. The apparatus of claim 1, wherein said at least one damper comprises a friction generating device.

100. The apparatus of claim 99, wherein said friction generating device is disposed radially outwardly of said energy storing elements.

101. The apparatus of claim 99, wherein said friction surface includes a first portion disposed at a first radial distance from said axis, an intermediate portion disposed at a greater second radial distance from said axis, and a third portion disposed at a greatest radial distance from said axis, said friction generating device being disposed at a fourth radial distance from said axis and said fourth distance at least matching said second distance.

102. The apparatus of claim 99, wherein said friction generating device comprises at least one shoe having two friction surfaces disposed at different radial distances from said axis.

103. The apparatus of claim 99, wherein said friction generating device includes at least one shoe in frictional engagement with said first flywheel.

104. The apparatus of claim 103, wherein said second flywheel includes a portion engaging said shoe.

105. The apparatus of claim 104, wherein said shoe and said portion of said second flywheel have a limited freedom of angular movement relative to each other about said axis.

106. The apparatus of claim 99, wherein said friction generating device comprises a plurality of shoes and said second flywheel comprises portions engaging said shoes, at least some of said shoes and the respective portions of said second flywheel being movable relative to each other about said axis with different freedoms of angular movement.

107. The apparatus of claim 99, further comprising a friction clutch disposed between said second flywheel and an input element of the transmission and comprising a housing having a portion extending in the direction of said axis and forming part of said friction generating device.

108. The apparatus of claim 99, wherein said first flywheel includes a mass forming part of said friction generating device.

109. The apparatus of claim 99, further comprising a friction clutch disposed between said second flywheel and an input element of the transmission and comprising a housing having a portion extending in the direction of said axis and being at least partially surrounded by a mass of said first flywheel, said friction generating device including at least one shoe at least close to a region where said mass surrounds said portion of said housing.

110. The apparatus of claim 99, wherein said friction generating device comprises at least one energy storing element.

111. The apparatus of claim 110, wherein said at least one energy storing element of said friction generating device is stressed in a direction substantially radially of said axis.

112. The apparatus of claim 99, wherein said friction generating device includes at least one shoe carried by said first flywheel.

113. The apparatus of claim 112, wherein said at least one shoe is clamped to said first flywheel.

114. The apparatus of claim 99, wherein said friction generating device comprises a plurality of shoes spaced apart from each other in a circumferential direction of said flywheels.

115. The apparatus of claim 99, wherein said friction generating device comprises at least one braking shoe having a friction generating portion of a plastic material.

116. The apparatus of claim 1, further comprising a friction clutch disposed between said second flywheel and an input element of the transmission and comprising a clutch disc and a clutch spring, at least one of said clutch disc and said clutch spring having at least one passage for a coolant.

117. The apparatus of claim 1, wherein further comprising a friction clutch disposed between said second flywheel and an input element of the transmission and comprising a housing including a portion extending in the direction of said axis and having at least one passage for a coolant.

118. The apparatus of claim 1 further comprising a friction clutch disposed between said second flywheel and an input element of the transmission and comprising a housing including a wall extending substantially radially of said axis and having at least one passage for a coolant.

119. The apparatus of claim 1, wherein said first flywheel has at least one passage for a coolant.

120. The apparatus of claim 1, wherein said second flywheel has at least one passage for a coolant, said at least one passage being disposed radially outwardly of an at least substantially sealed chamber receiving at least a portion of each of said energy storing elements.

121. The apparatus of claim 1, further comprising a friction clutch disposed between said second flywheel and an input element of the transmission and comprising a clutch disc, and an enclosure defining an at least substantially sealed chamber receiving at least a portion of each of said energy storing elements, said enclosure including at least one wall and said second flywheel having at least one first passage disposed radially outwardly of said chamber, said clutch disc having at least one second passage cooperating with said at least one first passage to define at least one path for the flow of a coolant through said clutch disc, along said at least one wall, through said second flywheel and toward said first flywheel.

122. The apparatus of claim 1, further comprising an enclosure defining an at least substantially sealed chamber receiving at least a portion of each of said energy storing elements, said enclosure having at least one wall and said first flywheel having at least one passage establishing a path for the flow of a coolant along said wall and along said second flywheel.

123. The apparatus of claim 1, wherein said first flywheel has at least one passage establishing a path for the flow of a coolant against said second flywheel.

124. The apparatus of claim 1, wherein at least one of said flywheels has a first side at said friction surface and an enlarged heat dissipating second side opposite said first side.

125. The apparatus of claim 1, further comprising a friction clutch disposed between said second flywheel and an input element of the transmission and comprising a pressure plate having a first side at said friction surface and an enlarged heat dissipating second side opposite said first side.

126. The apparatus of claim 1, further comprising a friction clutch disposed between said second flywheel and an input element of the transmission, at least one of (a) said friction clutch, (b) an enclosure for an at least substantially sealed chamber receiving at least a portion of each of said energy storing elements, and (c) at least one of said flywheels having at least one substantially vane-shaped air circulating portion.

127. The apparatus of claim 1, wherein said flywheels and a friction clutch disposed between said second flywheel and an input element of the transmission constitute a preassembled module and further comprising means for fastening said module to an output element of the prime mover.

128. The apparatus of claim 127, wherein said fastening means includes fasteners forming part of said module.

129. The apparatus of claim 128, wherein said module comprise means for non-separably confining said fastening therein.

130. The apparatus of claim 1, further comprising a push-type friction clutch disposed between said second flywheel and an input element of the transmission.

131. The apparatus of claim 1, further comprising a pull-type friction clutch disposed between said second flywheel and an input element of the transmission.

132. The apparatus of claim 1, further comprising means for limiting the magnitude of torque which said damper transmits between said flywheels, said limiting means being at least substantially coplanar with said energy storing elements and said second flywheel.

133. The apparatus of claim 132, wherein said energy storing elements are at least partially received in a substantially annular at least substantially sealed chamber.

134. The apparatus of claim 132, further comprising a bearing interposed between said flywheels and being at least substantially coplanar with said second flywheel, with said energy storing elements and with said limiting means.

135. The apparatus of claim 132, wherein said limiting means is disposed radially outwardly of said energy storing elements and radially inwardly of said second flywheel.

136. The apparatus of claim 1, wherein said first flywheel includes a portion which transmits torque from the prime mover to said energy storing elements and further comprising an enclosure defining an at least substantially sealed chamber receiving at least a portion of each of said energy storing elements, said enclosure including at least one wall receiving torque from said energy storing elements, and means for limiting the magnitude of torque which is being transmitted from said second flywheel to a friction clutch interposed between said second flywheel an a rotary input element of the transmission, said limiting means including said slip clutch and comprising at least one friction generating member disposed between said enclosure and said second flywheel at least partially radially outwardly of said energy storing elements and at least partially radially inwardly of said friction surface.

137. The apparatus of claim 136, wherein said limiting means further comprises means for biasing said second flywheel and said enclosure against said at least one friction generating member.

138. The apparatus of claim 137, wherein said biasing means includes at least one diaphragm spring.

139. The apparatus of claim 136, further comprising biasing means actuatable to urge said second flywheel and said enclosure against said at least one friction generating member.

140. The apparatus of claim 139, further comprising means for actuating said biasing means, said actuating means being operable by said first flywheel.

141. The apparatus of claim 140, wherein at least a portion of said actuating means is of one piece with said first flywheel.

142. The apparatus of claim 1, further comprising a bearing between said flywheels, said first flywheel being arranged to be rotated by a rotary output element of the prime mover and said second flywheel being arranged to transmit torque to a rotary input element of the transmission by a friction clutch having at least one friction surface disposed at a first radial distance from said axis, said energy storing elements of said damper being disposed at least in part in an at least substantially sealed chamber at a second radial distance from said axis less than said first radial distance.

143. The apparatus of claim 1, further comprising a bearing interposed between said flywheels, said first flywheel being connectable with a rotary output element of the prime mover and said second flywheel being connectable with a rotary input element of the transmission by a friction clutch, said friction surface being disposed at a first radial distance from said axis and said energy storing elements being disposed at least in part in an at least substantially sealed chamber and extending in said direction circumferentially of said flywheels at a second radial distance from said axis less than said first radial distance, said energy storing elements being at least partially confined in at least one of said flywheels as seen in the direction of said axis.

144. The apparatus of claim 1, wherein said energy storing elements include at least one coil spring having an end convolution and at least one additional convolution at least similar to said end convolution, said damper further comprising an input member driven by one of said flywheels, engaging said end convolution and being configurated to transmit to said end convolution torque without appreciably changing the orientation of said end convolution relative to said at least one additional convolution in response to rotation of said one flywheel, said damper further comprising at least one output member arranged to transmit torque from said at least one coil spring to the other of said flywheels in response to rotation of said one flywheel.

145. The apparatus of claim 1, wherein said energy storing elements comprise at least one coil spring including an end convolution having a first pitch and at least one additional convolution at least similar to said end convolution and having a second pitch at least approximating said first pitch, said damper further comprising at least one input member driven by one of said flywheels and arranged to transmit torque to said end convolution without appreciably changing said first pitch, said damper further comprising at least one rotary output member arranged to transmit torque from said at least one coil spring to the other of said flywheels in response to rotation of said one flywheel.

146. Apparatus for transmitting torque comprising: a first flywheel connectable to a rotary output element; a second flywheel rotatable with as well as relative to said first flywheel about a common axis, connectable with a rotary input element and provided with a friction surface; means for opposing rotation of said flywheels relative to each other, including at least one damper having energy storing means disposed at least in part in an enclosure defining a chamber for said energy storing means; and means for limiting the magnitude of torque which is transmitted from said friction surface, said first flywheel including a portion which transmits torque from the output element to said energy storing means and said enclosure, including at least one wall receiving torque from said energy storing means, said limiting means comprising at least one friction generating member disposed between said enclosure and said second flywheel at least partly radially outwardly of said energy storing means and at least partly radially inwardly of said friction surface.

147. Apparatus for transmitting torque between a rotary output element and a rotary input element comprising: first and second flywheels rotatable with as well as relative to each other about a common axis; a bearing between said flywheels; means for fastening said first flywheel to the rotary output element; a friction clutch having an annular friction surface, said second flywheel being connectable to the rotary input element by said friction clutch, and the input element having a profile disposed at a first radial distance from said axis; means for opposing rotation of said flywheels relative to each other including at least one damper having energy storing means disposed radially inwardly of said friction surface as seen in the direction of said axis, an input member between said first flywheel and said energy storing means, and an output member between said energy storing means and said second flywheel; and an enclosure defining a chamber for a portion at least of said energy storing means, said bearing being disposed at a second radial distance from said axis, said fastening means being disposed between said energy storing means and said bearing at a third radial distance from said axis, said enclosure having a first portion disposed at a fourth radial distance from said axis, said energy storing means being disposed at a fifth radial distance from said axis, said enclosure further comprising a second portion at a sixth radial distance from said axis and said friction surface being disposed at a seventh radical distance from said axis, at least four of said first to seventh distances being different from each other.

148. Apparatus for transmitting torque comprising: an engageable and disengageable friction clutch including a pressure plate rotatable about and movable in the direction of a predetermined axis; a driven counterpressure plate coaxial with and arranged to rotate said pressure plate; means for biasing said pressure plate axially toward said counterpressure plate in the engaged condition of the clutch, said biasing means comprising a diaphragm spring having an annular energy storing main portion, prongs extending substantially radially inwardly from said main portion and opening provided between at least some of said prongs, projections of one piece with said pressure plate and received in said openings in at least one of the engaged and disengaged conditions of the clutch; and elastically deformable elements arranged to transmit torque between said projections of said pressure plate and a clutch housing.

149. Apparatus for transmitting torque comprising; a friction clutch including a rotary pressure plate; a rotary housing coaxial with said pressure plate and having a first side confronting said pressure plate and a second side facing away from said pressure plate; a diaphragm spring disposed between said housing and said pressure plate and including an annular energy storing main portion and tongues extending substantially radially inwardly from said main portion; and means for coupling said pressure plate to said housing with freedom of movement in the direction of the common axis of said housing and said pressure plate, said coupling means comprising leaf springs disposed at least substantially radially inwardly of said main portion and at least a portion of each of said leaf springs being disposed at the second side of said housing.

150. Apparatus for transmitting torque comprising; first and second flywheels rotatable with as well as relative to each other about a common axis; and means for opposing rotation of said flywheels relative to each other including a friction generating device having at least one shoe with first and second friction surfaces disposed at different radial distances from said axis and respectively confronting and force-locking engaging first and second complementary friction surfaces provided on one of said flywheels.

151. Apparatus for transmitting torque, comprising a first flywheel connectable with a rotary output element of a prime mover; a second flywheel rotatable with as well as relative to said first flywheel about a common axis and provided with at least one friction surface disposed at a first radial distance from said axis, said second flywheel being connectable with a rotary input element of a transmission by a friction clutch; a bearing interposed between said flywheels; and means for opposing rotation of said flywheels relative to each other including at least one damper having at least two energy storing elements disposed at least in part in an at least substantially sealed chamber and extending in a circumferential direction of said flywheels at a lesser second radial distance from said axis, said first flywheel including a portion which transmits torque from the prime mover to said energy storing elements and further comprising an enclosure defining said chamber and including at least one wall receiving torque from said energy storing elements, and means for limiting the magnitude of torque which is being transmitted from said second flywheel to said clutch, said limiting means comprising at least one friction generating member disposed between said enclosure and said second flywheel at least partially radially outwardly of said energy storing elements and at least partially radially inwardly of said at least one friction surface.

152. The apparatus of claim 151, wherein said limiting means further comprises means for biasing said second flywheel and said enclosure against said at least one friction generating member.

153. The apparatus of claim 152, wherein said biasing means includes at least one diaphragm spring.

154. The apparatus of claim 151, further comprising biasing means actuatable to urge said second flywheel and said enclosure against said at least one friction generating member.

155. The apparatus of claim 154, further comprising means for actuating said biasing means, said actuating means being operable by said first flywheel.

156. The apparatus of claim 155, wherein at least a portion of said actuating means is of one piece with said first flywheel.

* * * * *